US012292283B2

(12) United States Patent
Isoda et al.

(10) Patent No.: US 12,292,283 B2
(45) Date of Patent: May 6, 2025

(54) IMAGING RANGE ESTIMATION DEVICE, IMAGING RANGE ESTIMATION METHOD, AND PROGRAM

(71) Applicant: Nippon Telegraph and Telephone Corporation, Tokyo (JP)

(72) Inventors: Takuma Isoda, Musashino (JP); Hirofumi Noguchi, Musashino (JP); Misao Kataoka, Musashino (JP); Kyota Hattori, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 407 days.

(21) Appl. No.: 17/792,340

(22) PCT Filed: Jan. 15, 2020

(86) PCT No.: PCT/JP2020/001006
§ 371 (c)(1),
(2) Date: Jul. 12, 2022

(87) PCT Pub. No.: WO2021/144874
PCT Pub. Date: Jul. 22, 2021

(65) Prior Publication Data
US 2023/0049073 A1 Feb. 16, 2023

(51) Int. Cl.
*G01C 11/06* (2006.01)
*G06T 7/70* (2017.01)

(52) U.S. Cl.
CPC .............. *G01C 11/06* (2013.01); *G06T 7/70* (2017.01)

(58) Field of Classification Search
CPC ........... G01C 11/06; G01C 11/04; G06T 7/70; H04N 7/18; H04N 17/00; H04N 23/60
(Continued)

(56) References Cited

U.S. PATENT DOCUMENTS

2009/0324058 A1* 12/2009 Sandage ............... G06F 18/256
382/154
2014/0064624 A1* 3/2014 Kim ..................... G06V 10/757
382/201
(Continued)

OTHER PUBLICATIONS

Estimating Camera Pose from a Single Urban Ground-View Omnidirectional image and a 2D Building Outline Map by Tat-Jen Cham, Arridhana Ciptadi, Wei-Chian Tan, Minh-Tri Pham 2010 IEEE Computer Society Conference on Computer Vision and Pattern Recognition (2010, pp. 366-373) Jun. 1, 2010 (Year: 2010).*
(Continued)

*Primary Examiner* — Nancy Bitar
*Assistant Examiner* — Heath E. Wells
(74) *Attorney, Agent, or Firm* — Fish & Richardson P.C.

(57) ABSTRACT

An imaging range estimation device includes an image data processor configured to acquire image data imaged by a camera device and generate image data with an object name label added, a reference data generator configured to set, by using geographic information, a region within a predetermined distance that is imagable from an estimated position at which the camera device is installed and generate reference data with an object name label added, and an imaging range estimator configured to calculate a concordance rate by comparing a feature indicated by a region of an object name label of the image data with a feature indicated by a region of an object name label of the reference data, and estimate the imaging range of the camera device to be a region of the reference data that corresponds to the image data.

9 Claims, 19 Drawing Sheets

(58) Field of Classification Search
USPC .......................................................... 382/154
See application file for complete search history.

(56) References Cited

U.S. PATENT DOCUMENTS

2020/0026902 A1* 1/2020 Abeywardena ........ G05D 1/606
2022/0187841 A1* 6/2022 Ebrahimi Afrouzi .......................
G05D 1/0274

OTHER PUBLICATIONS

Automatic Registration of Optical Images with Airborne LiDAR Point Cloud in Urban Scenes Based on Line-Point Similarity Invariant and Extended Collinearity Equations by Peng, Shubiao, Ma, Hongchao, Zhang, Liang, Sensors (Basel, Switzerland), 19(5), 1086 Mar. 3, 2019 (Year: 2019).*

Automated Map Reading: Image Based Localisation in 2-D Maps Using Binary Semantic Descriptors by Panphattarasap, Pilailuck, Calway, Andrew, IEEE/RSJ International Conference on Intelligent Robots and Systems 2018, Mar. 2, 2018 (Year: 2018).*

Piasco et al., "A survey on Visual-Based Localization: On the benefit of heterogeneous data," Pattern Recognition, Feb. 2018, 74:90-109.

Cham et.al., "Estimating Camera Pose from a Single Urban Ground-View Omnidirectional Image and a 2D Building Outline Map," IEEE Computer Society Conference on Computer Vision and Pattern Recognition, Dec. 2010, pp. 366-373.

* cited by examiner

FIG. 3

| EXTRACTION LINE NO. | LABEL NAME AND LABEL PROPORTION IN IMAGE DATA |
|---|---|
| 1 | (Road, Sidewalk, Building)=(0.2, 0.2, 0.6) |
| 2 | (Road, Sidewalk, Building)=(0.5, 0.2, 0.3) |
| 3 | (Road, Sidewalk, Building)=(0.6, 0.2, 0.2) |

FIG. 6

| LINE SEGMENT NO. | LABEL NAME AND LABEL PROPORTION OF LINE SEGMENT |
|---|---|
| 1 | (Sidewalk, Road)=(0.1, 0.9) |
| 2 | (Road, Sidewalk, Building)=(0.5, 0.2, 0.3) |
| 3 | (Road, Sidewalk, Building)=(0.2, 0.2, 0.6) |

FIG. 15

| LINE NO. | LABEL NAME AND LABEL PROPORTION IN IMAGE DATA |
|---|---|
| 1 | (Road, Sidewalk, Building)=(0.2, 0.2, 0.6) |
| 2 | (Road, Sidewalk, Building)=(0.3, 0.2, 0.5) |
| 3 | (Road, Sidewalk, Building)=(0.5, 0.2, 0.3) |
| 4 | (Road, Sidewalk, Building)=(0.55, 0.2, 0.25) |
| 5 | (Road, Sidewalk, Building)=(0.6, 0.2, 0.2) |

FIG. 16

| LINE NO. | LABEL NAME AND LABEL PROPORTION FOR CANDIDATE REGION A |
|---|---|
| 1 | (Road, Sidewalk, Building)=(0.2, 0.2, 0.6) |
| 2 | (Road, Sidewalk, Building)=(0.3, 0.2, 0.5) |
| 3 | (Road, Sidewalk, Building)=(0.5, 0.2, 0.3) |
| 4 | (Road, Sidewalk, Building)=(0.55, 0.2, 0.25) |
| 5 | (Road, Sidewalk, Building)=(0.6, 0.2, 0.2) |

FIG. 17

| LINE NO. | LABEL NAME AND LABEL PROPORTION FOR CANDIDATE REGION B |
|---|---|
| 1 | (Road, Sidewalk, Building)=(0.2, 0.2, 0.6) |
| 2 | (Road)=(1.0) |
| 3 | (Road, Sidewalk, Building)=(0.5, 0.2, 0.3) |
| 4 | (Road, Sidewalk, Building)=(0.4, 0.3, 0.3) |
| 5 | (Road, Sidewalk, Building)=(0.6, 0.2, 0.2) |

IMAGING RANGE ESTIMATION DEVICE, IMAGING RANGE ESTIMATION METHOD, AND PROGRAM

CROSS-REFERENCE TO RELATED APPLICATIONS

This application is a National Stage application under 35 U.S.C. § 371 of International Application No. PCT/JP2020/001006, having an International Filing Date of Jan. 15, 2020, the disclosure of which is considered part of the disclosure of this application, and is incorporated by reference in its entirety into this application.

TECHNICAL FIELD

The present invention relates to an imaging range estimation device, an imaging range estimation method, and a program for estimating an imaging range of a camera device.

BACKGROUND ART

In recent years, data has been more open. For example, self-governing bodies have advanced efforts to make data such as demographics accessible so that the data can be used by other self-governing bodies and business operators. Data sharing can occur within a company as well. One such case is when data is shared among stores for the purpose of cracking down on shoplifting. Rather than be kept separately by each store within its premises, shoplifter data is aggregated on a cloud server and shared among stores to crack down on shoplifters across the stores. As described above, an IoT (Internet of Things) platform equipped with data aggregation and general-purpose analysis applications for each industry and field have already been constructed. A number of IoT platforms have been established for data sharing across business operators, and it is expected that data sharing across industries/fields will continue to progress.

However, for individual users, the openness and sharing of data has not progressed in comparison to business operators. IoT device owners currently install IoT platforms for their own purposes, and data sharing is often limited to individuals. Thus, it takes labor for another person to use such data. For example, when a suspicious person appears in a certain city, and the face, clothes, and position of the suspicious person are unknown, the police requests disclosure of surveillance camera information of nearby stores and private homes based on witness information to acquire images. In this manner, the police acquires information on the appearance of the suspicious person.

In order for the openness and/or sharing of data to progress with the inclusion of individual users, an IoT platform with a low entry barrier is required. Specifically, from the standpoint of a device owner, it is necessary to reduce operations to register with the IoT platform, make device registration beneficial, and guarantee the protection of personal information. This is because it is believed that the device owner is less likely to perform a time-consuming task of registering a device unless the cost-effectiveness for the device owner is improved. From the standpoint of a data user and a service provider, it is necessary to reduce the number of search operations for a target device. This is because it is considered to be difficult to manually search for target data or a target device from a huge number of registered devices.

Among IoT devices, the number of cameras used for crime prevention is especially on a rapid rise, with the number reaching 5 million in Japan and hundreds of millions in the world. With the development of image analysis technology and the cost reduction of camera devices in recent years, the importance of cameras capable of obtaining a large amount of information through images is increasing.

There are techniques for estimating the direction in which an image is taken and a position of a camera device by using information of an image taken by said camera device (see NPLs 1 and 2). The techniques described in NPLs 1 and 2 are techniques for recognizing the device position and direction of a mobile terminal such as a smartphone in an environment where GPS accuracy is low due to a group of buildings.

In the technique described in NPL 1, the camera position is estimated based on an image captured by a camera. In NPL 1, when an object is detected or an object contour is detected as a feature from an image captured on the ground (for example, a street view image) and the detected feature is registered in a database together with position information, the position of a device is estimated with reference to the registered information. In the technique of NPL 1, the more features are detected and registered, the more the accuracy of position estimation is improved.

In the technique described in NPL 2, a rectangle of a building in a satellite image or a bird's eye view image is extracted and recorded, the recorded rectangle is collated with a rectangle of a building extracted from an image captured on the ground, and the installed position and direction of a camera device that took the image on the ground is estimated.

CITATION LIST

Non-Patent Literature

NPL 1: Nathan Piasco, et. al., "A survey on Visual-Based Localization: On the benefit of heterogeneous data", Pattern Recognition, Volume 74, February 2018, Pages 90-109

NPL 2: Tat-Jen Cham, et. al., "Estimating Camera Pose from a Single Urban Ground-View Omnidirectional Image and a 2D Building Outline Map", IEEE Computer Society Conference on Computer Vision and Pattern Recognition, December 2010

SUMMARY OF THE INVENTION

Technical Problem

However, the technique described in NPL 1 requires on-the-ground, high-precision images to be taken in advance for an area of coverage so that features can be detected in detail from the image information. Expanding the area of coverage therefore requires cost, and it is difficult to cover all areas. For example, the current street view image providing service cannot be used to obtain on-the-ground images of an area with sparse population density or a narrow alley.

In the technique described in NPL 2, in the case of the satellite image, it is possible to comprehensively image all areas. However, with this technique, the presence of a building in an image taken by the camera is indispensable. Thus, the technique cannot be used in a range without a building. Moreover, estimation is not possible for an indoor imaging range.

The invention has been made in view of these points, and an object of the invention is to estimate an imaging range of a camera device from a camera image without depending on information collected in advance of images taken on the ground or on the presence of a building.

Means for Solving the Problem

According to the invention, an imaging range estimation device that estimates an imaging range of a camera device includes: an image data processor configured to acquire image data imaged by the camera device, perform image analysis to identify a first region occupied by each object displayed in the image data by adding an object name label to the first region, and generate image data with the object name label added; a reference data generator configured to set a second region within a predetermined distance by using geographic information, the second region being imagable from an estimated position at which the camera device is installed, and generate reference data in which an object name label is added to an object in the second region that is set, and an imaging range estimator configured to calculate a concordance rate by comparing a first feature indicated by the first region of each object name label of the image data with a second feature indicated by a region of each object name label of the reference data, and estimate the imaging range of the camera device to be a region of the reference data that corresponds to the image data.

Effects of the Invention

According to the invention, it is possible to estimate an imaging range of a camera device from a camera image without depending on information of an image captured on the ground that has been collected in advance or the presence of a building.

BRIEF DESCRIPTION OF DRAWINGS

FIG. 3 is a table showing a label name and a label proportion for each feature extraction line of the image data.

FIG. 6 is a table showing the label name and the label proportion of the line segment that is set in the reference data.

FIG. 15 is a table showing the label name and the label proportion for each feature extraction line of the image data.

FIG. 16 is a table showing the label name and the label proportion for a candidate region.

FIG. 17 is a table showing the label name and the label proportion for another candidate region.

DESCRIPTION OF EMBODIMENTS

Next, an embodiment of the invention (hereinafter referred to as an "embodiment") will be described.

Figure 1:
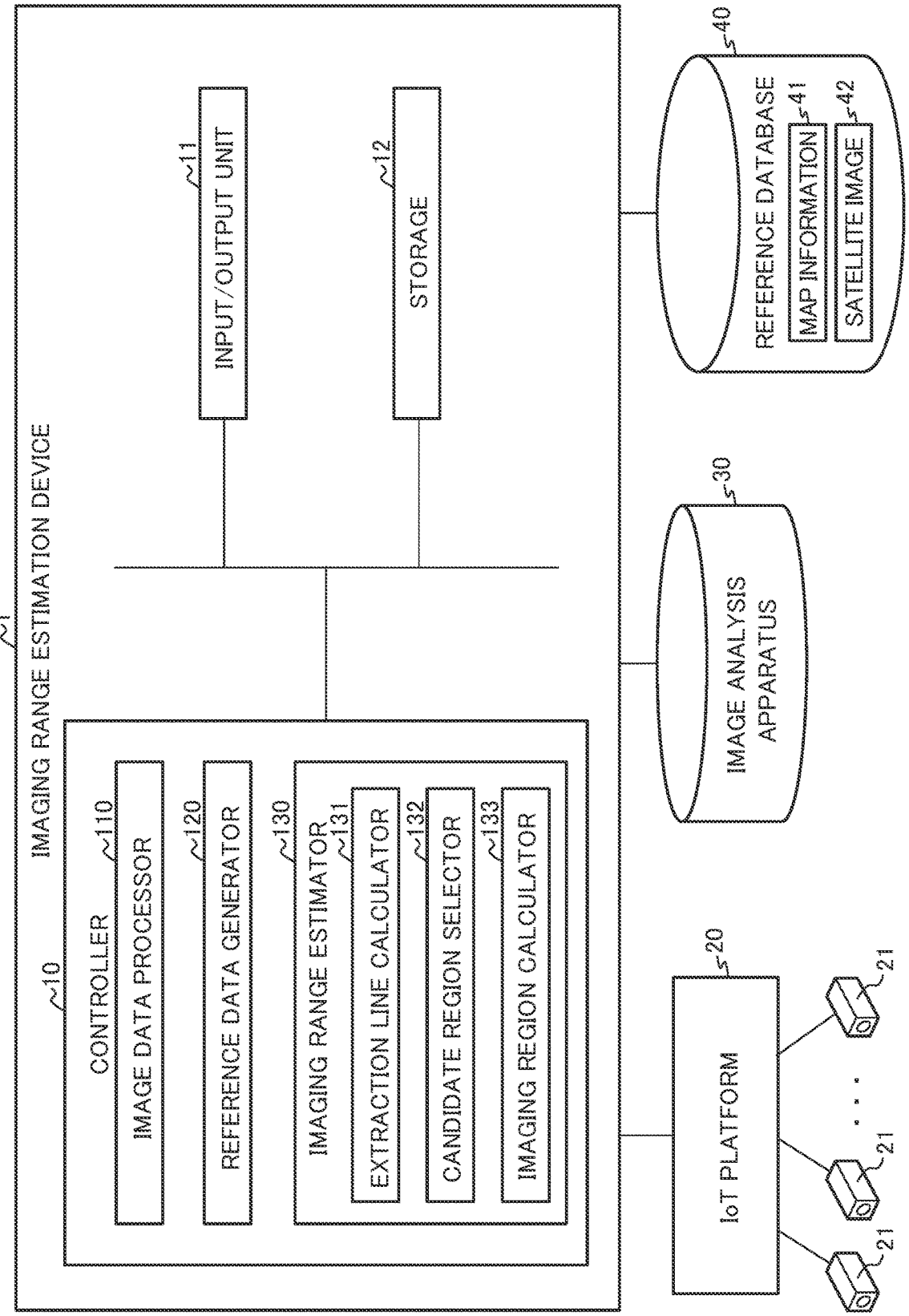
FIG. 1 is a block diagram illustrating a configuration of an imaging range estimation device according to an embodiment.

FIG. 1 is a block diagram illustrating a configuration of an imaging range estimation device 1 according to an embodiment.

The imaging range estimation device 1 according to the embodiment estimates the imaging range and the position of a camera device 21 based on image data imaged by the camera device 21 and geographic information such as map information or a satellite image around the camera device 21.

The imaging range estimation device 1 is connected to an IoT platform 20, an image analysis apparatus 30, a reference database 40, or the like.

The IoT platform 20 stores image data acquired from the camera device 21, such as a surveillance camera, as an IoT device. Added to the image data from the camera device 21 is information for specifying (estimating) the position of the camera device 21 along with identification information of the camera device 21. For example, the information is position information (longitude/latitude information itself or address information) of the camera device 21, an IP address, or information from which a position of a device such as a wireless base station of, for example, Wi-Fi (a registered trademark) can be estimated.

The image analysis apparatus 30 includes a function of a general image analysis. By performing image analysis on image data, the image analysis apparatus 30 performs object recognition on a pixel-by-pixel basis and assigns an object name label to each region in the image data. The installation location of the camera device 21 differs depending on, for example, street surveillance, natural surveillance, in-vehicle, and the like. Thus, the image analysis apparatus 30 performs the analysis by using AI (artificial intelligence) or the like using a learning model suitable for the installation location.

In the reference database 40 is stored either map information 41 or a satellite image 42 or both map information 41 and a satellite image 42. For the map information 41, it is assumed that a positional relationship of objects such as a building, a sidewalk, a road, a plant (street tree), or the like is known and a type of object, that is, an object name label, is known.

For the satellite image 42, an object name label can be assigned to a position of an object by causing the image analysis apparatus 30 to analyze the satellite image.

Regarding the map information 41 and satellite image 42, the two types of information are not required to be stored in one database (reference database 40) and may be stored in different databases.

The imaging range estimation device 1 compares (a) a feature based on object recognition that is obtained by image analysis of image data (captured image) of the camera device 21 with (b) a feature obtained from reference data generated from the map information or satellite image. Then, the imaging range estimation device 1 calculates a region in which the features coincide with each other more as an imaging range. Functions of the imaging range estimation device 1 will be described with reference to FIG. 1.

The imaging range estimation device 1 is realized by a computer that includes a controller 10, an input/output unit 11, and a storage 12.

The input/output unit 11 is configured to include a communication interface for transmitting and receiving information to and from the IoT platform 20, the image analysis apparatus 30, the reference database 40, and the like and an input/output interface for transmitting and receiving information between an input device such as a touch panel or a keyboard and an output device such as a monitor.

The storage 12 is configured to include a flash memory, a hard disk, a random access memory (RAM), or the like. The storage 12 in the imaging range estimation device 1 stores information and the like required during processing and a program for realizing the functions of the controller 10.

As illustrated in FIG. 1, the controller 10 is configured to include an image data processor 110, a reference data generator 120, and an imaging range estimator 130.

The image data processor 110 acquires image data imaged by the camera device 21, performs image analysis for identifying a region occupied by each object reflected in the image data with an object name label, and generates image data with the object name label.

More specifically, the image data processor 110 acquires, from the IoT platform 20, image data to be processed for estimating the imaging range. At this stage, the image data processor 110 also acquires information regarding the position of the camera device that obtained the image data.

When the information regarding the position of the camera device is not information on the installation position of the camera device 21 (latitude/longitude, address, or the like), the image data processor 110 collects information (area-specific information) for specifying the approximate region from an external device (not illustrated) or the like based on information such as an IP address or information on a wireless base station.

The image data processor 110 transmits the acquired image data to the image analysis apparatus 30 via a network or the like. The image data processor 110 acquires, from the image analysis apparatus 30, information (see FIG. 2 and the like described later) in which an object name label (for example, a Building, a Sidewalk, a Road, or a Plant) is assigned to each region in the image data. The information is obtained as a result of the image analysis apparatus 30 performing image analysis of image data and object recognition on a pixel-by-pixel basis.

By using geographic information, the reference data generator 120 sets a region within a predetermined distance from an estimated position (camera position) where the camera device 21 is installed, the predetermined distance being a distance within which imaging by the camera device 21 is possible. The reference data generator 120 generates reference data obtained by adding an object name label to an object in the region that has been set.

Here, reference data refers to geographic information that is used when an imaging region is calculated from the image data imaged by the camera device 21.

Examples of reference data are map information and a satellite image. The reference data generator 120 acquires the map information 41 or the satellite image 42 by accessing the reference database 40 via a network or the like.

When the position information of the camera device 21 is known, the reference data generator 120 acquires, from the reference database 40, map information or a satellite image of a region within a circle that is centered on the camera position and has a maximum imaging distance (predetermined distance) as a radius. Here, as one example, the maximum imaging distance assumed for a general surveillance camera is set to several tens of meters, and description will be given in the following drawings and the like. When the position information of the camera device 21 is not known, the reference data generator 120 determines an estimated position of the camera device 21 based on area-specific information collected by the image data processor 110 and acquires map information or a satellite image from the reference database 40.

Figure 4:
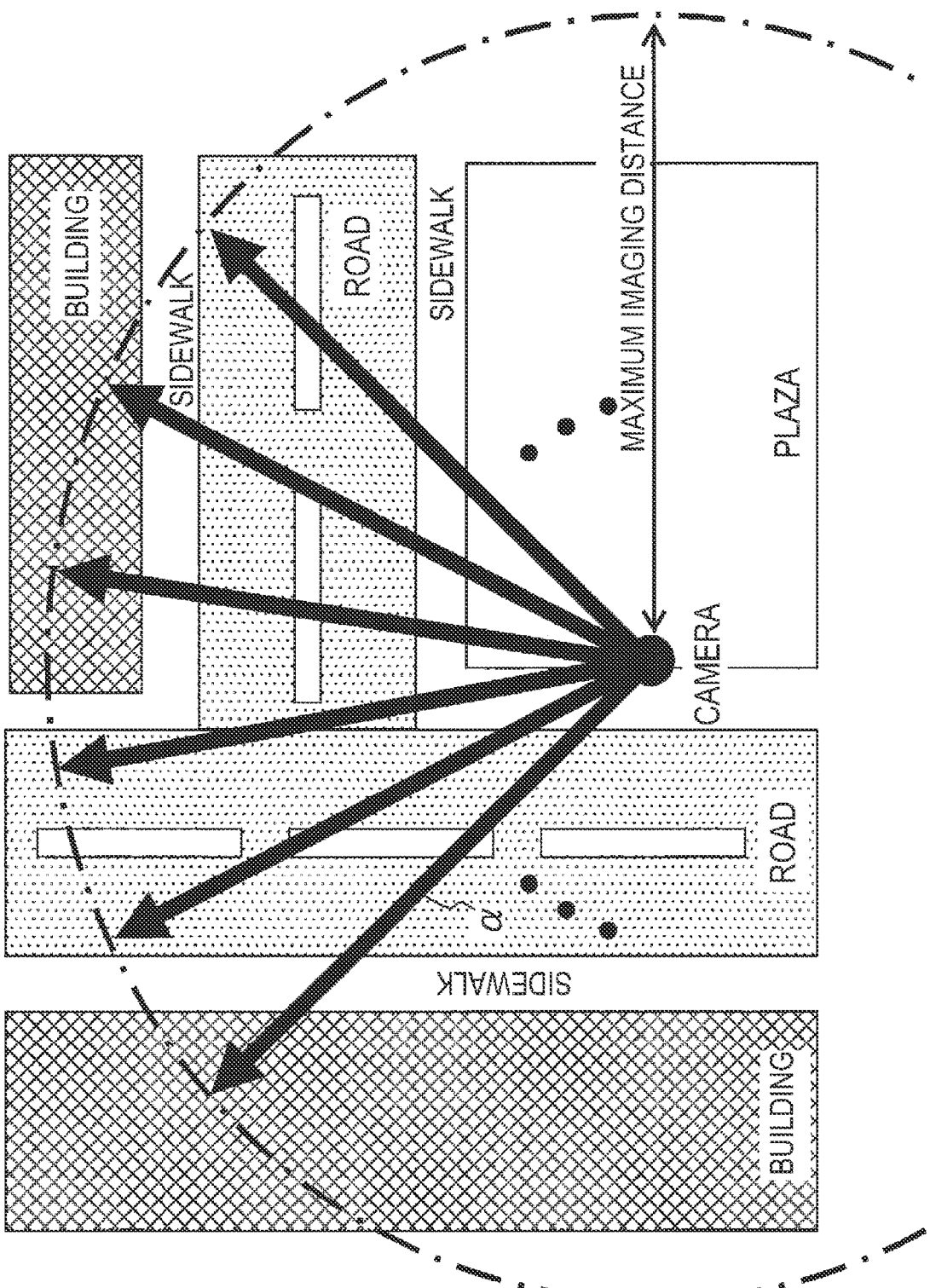
FIG. 4 is a diagram illustrating an example in which a candidate feature extraction line is set in reference data.

When the reference data generator 120 uses map information as the reference data, the object name label within the specified range is known based on the map information. When a satellite image is used as the reference data, the reference data generator 120 transmits the satellite image to the image analysis apparatus 30. In this way, the reference data generator 120 acquires information (see FIG. 4 and the like described later) from the image analysis apparatus 30 in which an object name label (for example, a Building, a Sidewalk, a Road, or a Plant) is assigned to each region in the satellite image. The information is obtained as a result of the image analysis apparatus 30 performing image analysis of the satellite image and object recognition on a pixel-by-pixel basis.

The imaging range estimator 130 calculates a concordance rate by comparing the feature indicated by the region of each object name label of the image data with the feature indicated by the region of each object name label of the reference data, and estimates the imaging range of the camera device 21 to be a region of the reference data that corresponds to the image data.

The imaging range estimator 130 estimates the imaging range (details will be described later) by narrowing down candidate regions in the reference data by using an "extraction line concordance rate calculation function", a "candidate region selection function", and an "imaging-range calculation function".

The imaging range estimator 130 is configured to include an extraction line calculator 131, a candidate region selector 132, and an imaging range calculator 133 that correspond to the functions described above.

Extraction Line Concordance Rate Calculation Function

The extraction line calculator 131 acquires image data with an object name label from the image data processor 110 and acquires reference data with an object name label from the reference data generator 120. The extraction line calculator 131 calculates, for example, lines (line segments) corresponding to feature extraction lines that are set at least at the left end and the right end of the image data from feature extraction lines ("candidate feature extraction lines"; to be described later) provided in the reference data. Detailed description is given below.

Figure 2:
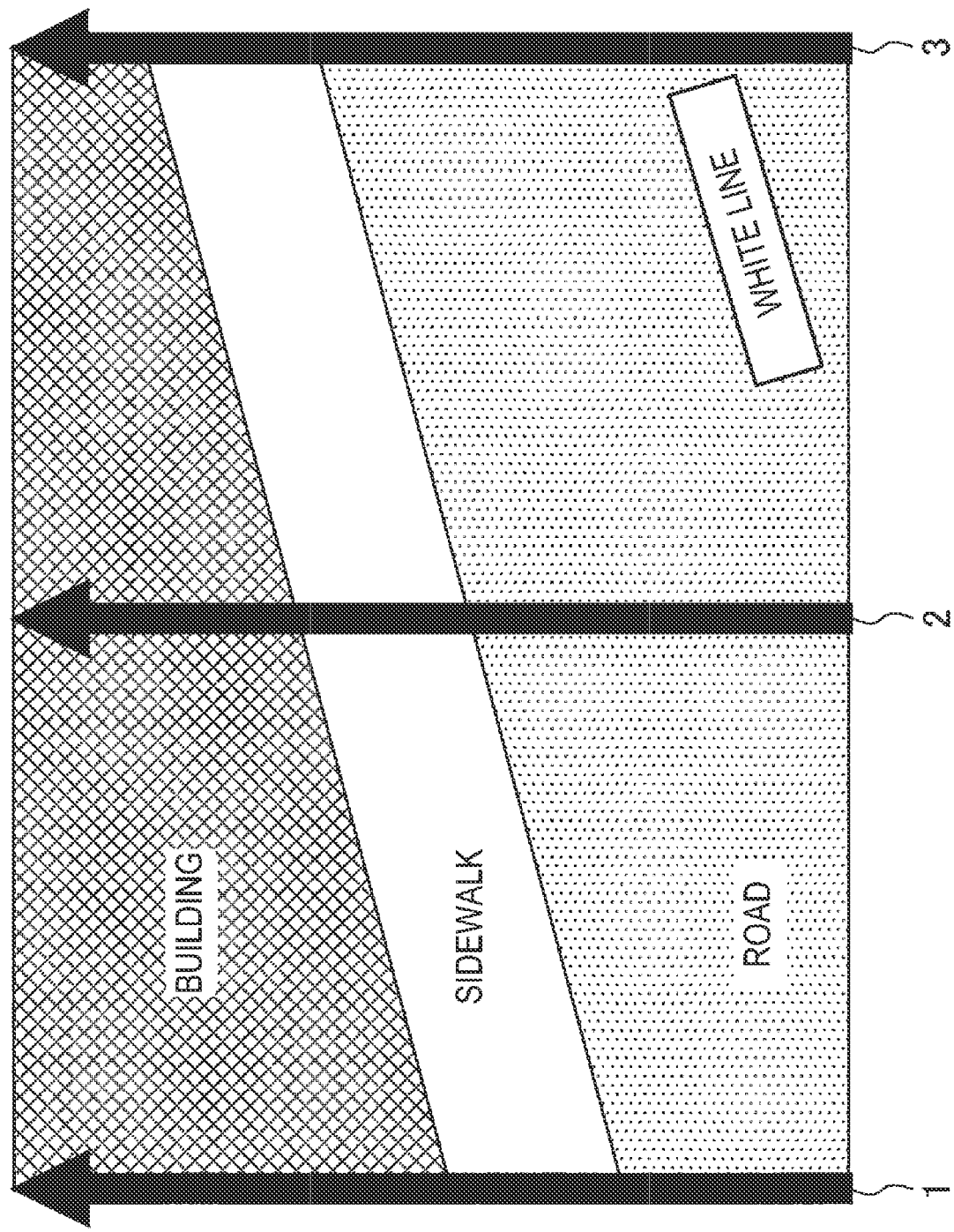
FIG. 2 is a diagram illustrating an example in which a feature extraction line is set in image data.

First, when the camera device 21 takes an image diagonally downwards like a surveillance camera, the lower side of the image is in the vicinity of the camera and the upper side of the image is further away from the camera. Thus, the extraction line calculator 131 draws a line from the bottom to the top of the image data (captured image), extracts an object name on the line, and sets the line as a feature extraction line of the image data. Here, as illustrated in FIG. 2, the extraction line calculator 131 sets, for example, three feature extraction lines, the left end of the image data (extraction line number "1"), the center of the image data (extraction line number "2"), and the right end of the image data (extraction line number "3"). Setting feature extraction lines at the left end and the right end are required at least. By setting more feature extraction lines, accuracy can be improved.

At this time, the extraction line calculator 131 calculates a label proportion of an object name label (label name) in each feature extraction line of the image data. As shown in the example of FIG. 3, the extraction line calculator 131 calculates the label proportion of each object name label in a feature extraction line by setting the denominator to the number of pixels in the vertical direction of the image data and setting the numerator to the number of pixels of the corresponding object name label.

In FIG. 3, the feature extraction line on the left end with extraction line number "1" has proportions (label proportions) (0.2, 0.2, 0.6) for the respective object name labels a Road, a Sidewalk, and a Building that are in the order in which they are found on the feature extraction line starting from the bottom of the image data (captured image).

In the reference data generated by the reference data generator 120, the extraction line calculator 131 draws a line in a radial direction of and within a circle that is centered on the position (estimated position) of the camera device 21 and has a radius set to the maximum imaging distance (predetermined distance) of the camera device 21. The extraction line calculator 131 extracts an object name that is along the drawn line and sets the drawn line as a feature extraction line of the reference data (see FIG. 4). The feature extraction line of the reference data is referred to as a "candidate feature extraction line" below. The number of candidate feature extraction lines that are set by the extraction line calculator 131 can be set arbitrarily. For example, the number of candidate feature extraction lines extracted when an angle is changed by one degree is 360.

Figure 5:
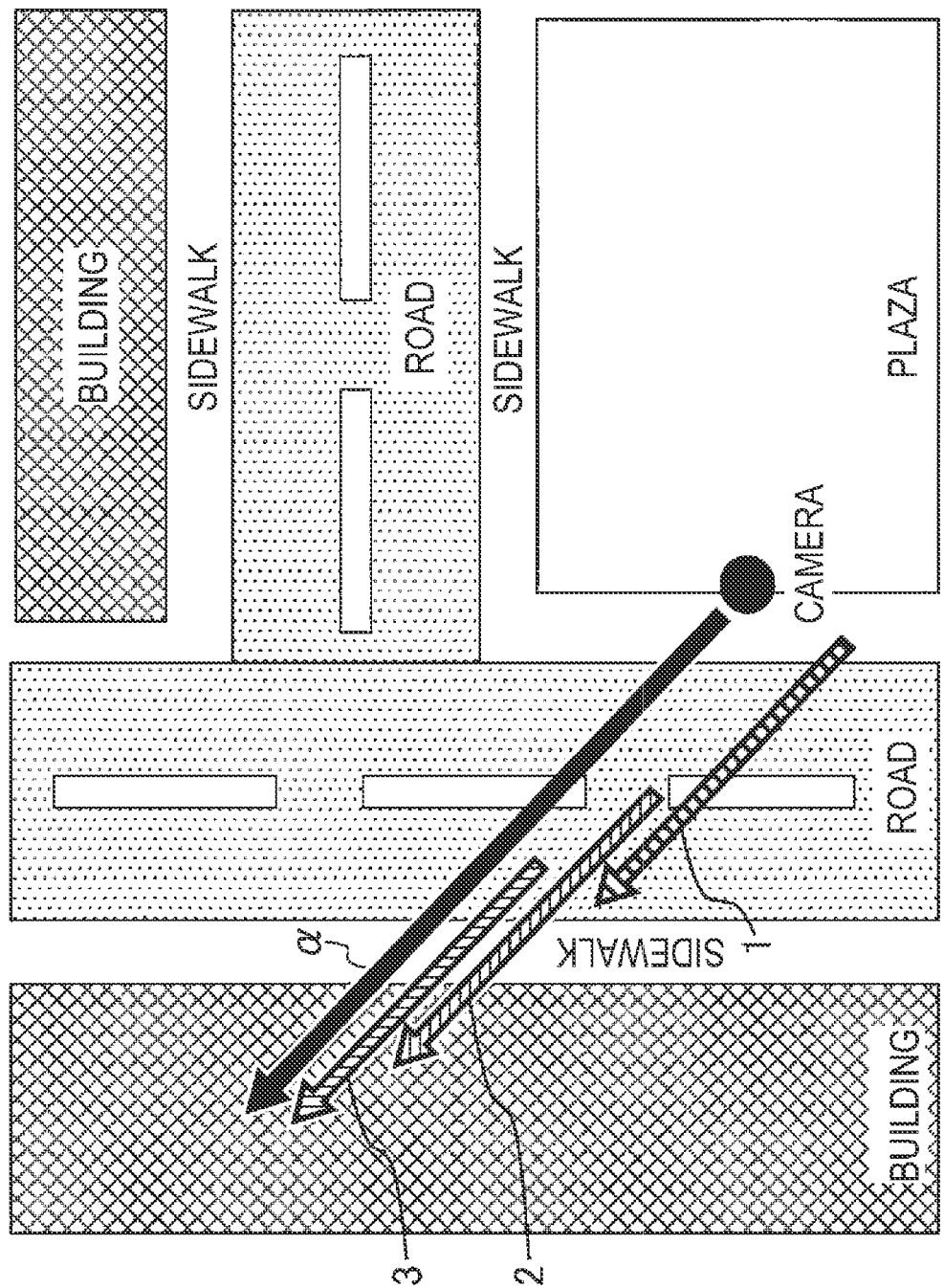
FIG. 5 is a diagram illustrating an example in which a line segment is set on a candidate feature extraction line of the reference data.

The extraction line calculator 131 further provides a line segment in which a start point and an end point are set arbitrarily on a candidate feature extraction line. For example, as shown in FIG. 5, the extraction line calculator 131 provides line segments (line segment numbers "1", "2", and "3") with different start points and end points for the candidate feature extraction line "a" of FIG. 4. Note that in FIG. 5, so that line segments overlapping the candidate feature extraction line "a" can be distinguished, these line segments have been drawn so that they are shifted from the candidate feature extraction line "a".

At this time, the extraction line calculator 131 calculates the label proportion of an object name label on the line segment of each candidate feature extraction line of the reference data. The extraction line calculator 131 calculates the label proportion of the object name label in the reference data from the geographical distance of the corresponding object. In other words, the extraction line calculator 131 calculates the label proportion of each of the one or more object name labels on the candidate feature extraction line by setting the numerator as the planar distance for the corresponding object name and setting the denominator as the length of the entire line spanning the one or more object name labels. An example of calculated label proportions is given in FIG. 6.

In FIG. 6, in the candidate feature extraction line having the line segment number "1", proportions of object name labels Sidewalk and Road, which are in the order starting from the one closest to the camera in the reference data, are (0.1, 0.9) respectively. Building is not included. In the candidate feature extraction line having the line segment number "2", proportions of object name labels Road, Sidewalk, and Building in that order are (0.5, 0.2, 0.3) respectively. In the candidate feature extraction line having the line segment number "3", proportions of object name labels Road, Sidewalk, and Building in that order are (0.2, 0.2, 0.6) respectively.

The extraction line calculator 131 calculates a concordance rate between the label proportion of the object name label that is calculated for the feature extraction line of the image data and the label proportion of the object name label that is calculated for the line segment of the candidate feature extraction line of the reference data. Then, the extraction line calculator 131 extracts a line segment of the candidate feature extraction line of the reference data that has a high calculated concordance rate.

Specifically, the extraction line calculator 131 selects a line segment of a candidate feature extraction line whose number of the object name labels coincides. Then, the extraction line calculator 131 calculates the concordance rate between the selected line segment (may be referred to as a "candidate line segment" below) of the candidate feature extraction line and the feature extraction line of the image data using the following expression (Expression 1). Here, for example, the label number of the object name label "Road" is "1", the label number of the object name label "Sidewalk" is "2", and the label number of the object name label "Building" is "3".

Figure 7:
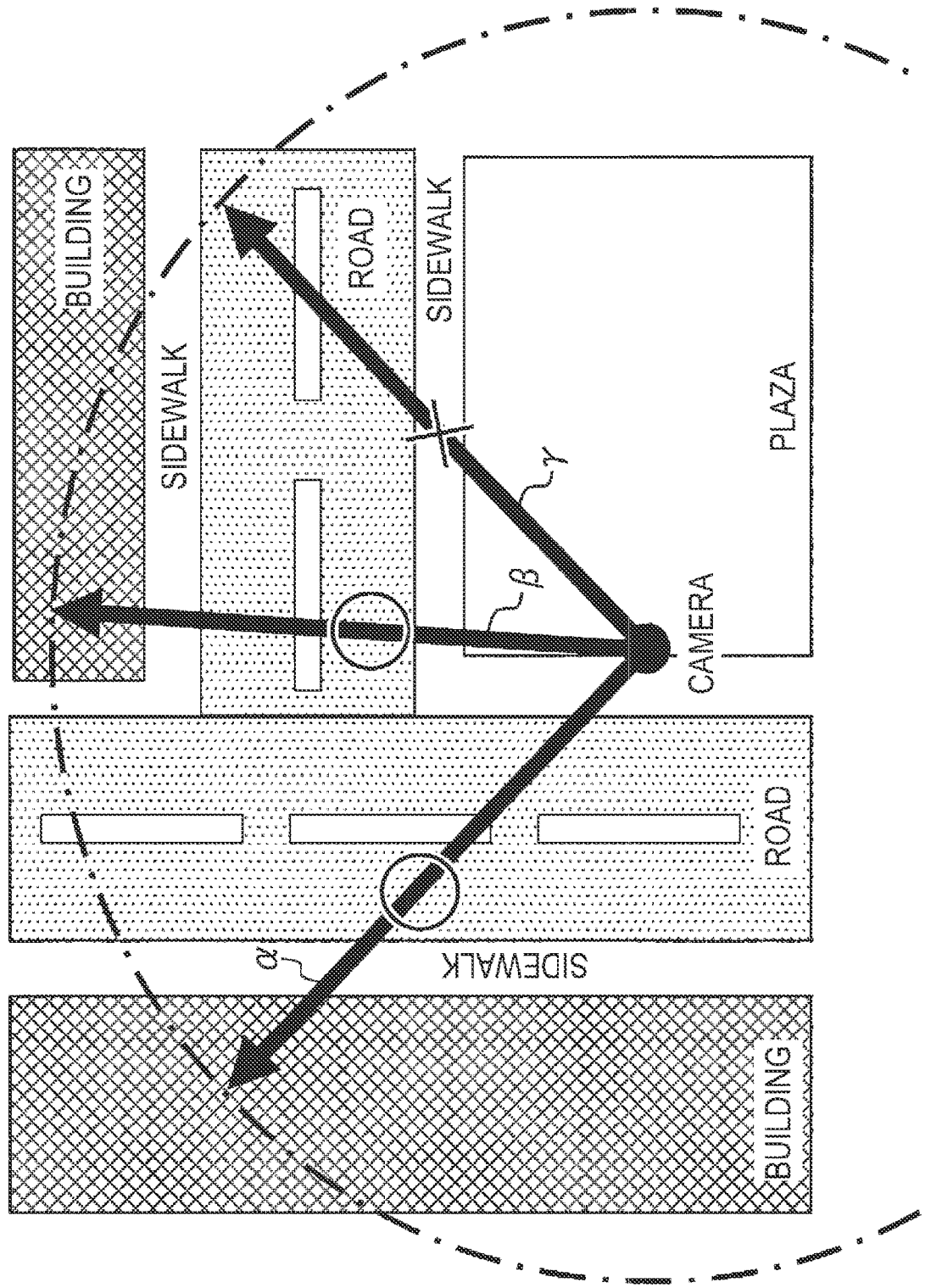
FIG. 7 is a diagram illustrating an example of candidate line segments having object name labels that do not coincide with each other, and candidate line segments having object name labels that coincide with each other.

The extraction line calculator 131 performs calculation by excluding in advance a candidate line segment whose object name label does not coincide from the calculation target of the concordance rate. For example, the extraction line number "1" of the image data includes the object name labels "Road", "Sidewalk", and "Building". In contrast, the candidate line segment "γ" indicated by the "x" mark in FIG. 7 does not include "Building" as an object name label, and is therefore excluded from the calculation target in advance. The candidate line segments "α" and "β" indicated by the "O" mark in FIG. 7 include "Road", "Sidewalk", and "Building" as object name labels and are therefore candidate line segments for which the concordance rate of a line segment is calculated.

> Concordance rate $L$ of a line segment=summation{concordance determination [0, 1] between the sum of label numbers of image data and the sum of label numbers of candidate line segments×(1−|candidate line segment label proportion−image data label proportion|)}  Expression 1

Here, when the sum of the label numbers of the image data does not coincide with the sum of the label numbers of the candidate line segments, [0] is set. And, when the sum of the label numbers of the image data coincides with the sum of the label numbers of the candidate line segments, [1] is set. A specific calculation example will be described later.

The extraction line calculator 131 repeatedly calculates the concordance rate L of a line segment using Expression 1 by adjusting the positions of the start point and the end point of the candidate line segment as parameters. The extraction line calculator 131 ends the process when the number of times of calculating the concordance rate L by adjusting the parameters is equal to or more than a predetermined number (lower limit), and the increase in the score of the concordance rate L is equal to or less than a predetermined threshold value.

In this way, it is possible to calculate, from the reference data, a line segment as a potential candidate corresponding to each of feature extraction lines (feature extraction lines of the left end, the center, and the right end) set in the image data as illustrated in FIG. 2 for example.

Candidate Region Selection Function

Returning to FIG. 1, a process executed by the candidate region selector 132 will be described in detail below. The candidate region selector 132 executes a process of roughly selecting a candidate region based on the line segments calculated by the extraction line calculator 131 as line segments corresponding to at least the feature extraction lines of the left end and the right end of the image data as described above.

Figure 8:
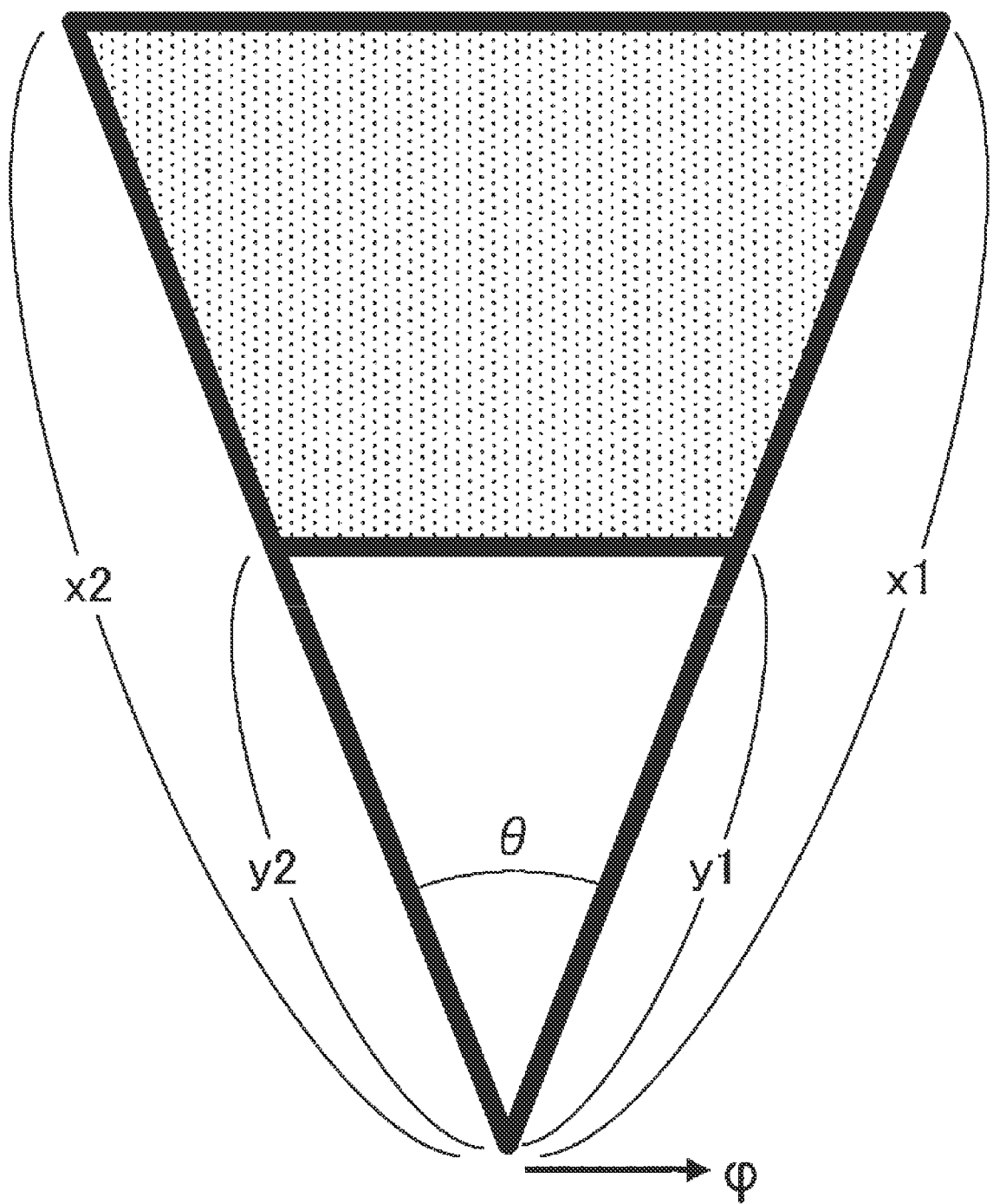
FIG. 8 is a diagram in which a projection surface of an angle of view of a camera on a ground is assumed to be a trapezoidal portion on a bottom side of an isosceles triangle with a camera position as a vertex.

The candidate region selector 132 sets one or more candidate regions by using information on the left end and the right end and information of another line segment that has been set, which have been calculated by the extraction line calculator 131. In order to roughly narrows down the candidate region, the candidate region selector 132 prioritizes a region having distances from the camera position to each end point of the left end and the right end that are close (equal) as illustrated in FIG. 8. This figure will be described later. FIG. 8 is a diagram in which a projection surface on the ground of an angle of view of a camera is assumed to be a trapezoidal portion on the bottom side of an isosceles triangle with the camera position as a vertex.

The candidate region selector 132 prioritizes a region in which the distances to the end points of the left end and the right end are equal to each other, and uses a standard deviation of a ratio between a distance from the vertex of the triangle illustrated in FIG. 8 to the start point of each extraction line segment and a distance from the vertex of the triangle to the end point (bottom side of an isosceles triangle) of each extraction line segment for an extraction line other than the extraction lines on the left end and the right end. In this manner, the candidate region selector 132 selects a region having a smaller value of effectiveness Y of the region, which is represented by the following Expression (Expression 2). Here, x1 illustrated in FIG. 8 is a distance from the camera position (vertex of the isosceles triangle) to the end point of the right end, and x2 is a distance from the camera position to the end point of the left end. A quadrangle (trapezoid) indicated by the following four points indicates a candidate region in reference data: the start point on the right end, which is indicated by y1 from the camera position, the end point on the right end, which is indicated by x1 from the camera position, the start point on the left end, which is indicated by y2 from the camera position, and the end point on the left end, which is indicated by x2 from the camera position.

Effectiveness $Y$ of region=$|x1-x2|\times$(standard deviation of a ratio between a distance from the vertex of the triangle to the start point of each extraction line segment and a distance from the vertex of the triangle to the end point of each extraction line segment) Expression 2

The viewing angle θ (see FIG. 8) of the camera, which is determined by the right end x1 and the left end x2 is set within a designated angle. Because the viewing angle of a wide-angle camera that is widely used is about 150 degrees, the upper limit of the viewing angle θ may be set to 180 degrees for example.

Figure 9:
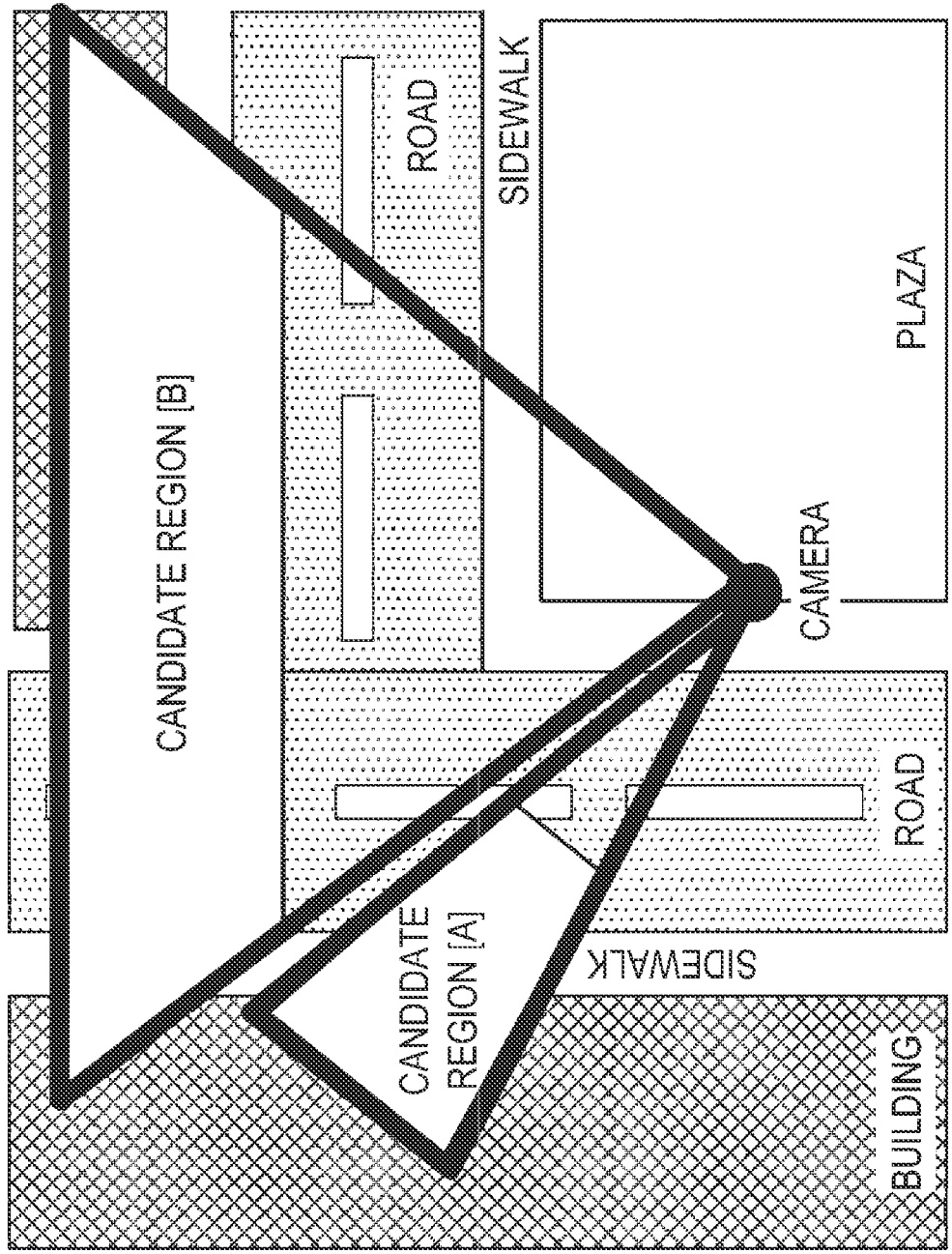
FIG. 9 is a diagram illustrating an example in which a candidate region is selected on the reference data.

Thus, for example, as illustrated in FIG. 9, the candidate region selector 132 selects a plurality of candidate regions such as a candidate region A and a candidate region B. In Expression 2, when the distances of the right end x1 and the left end x2 are equal, the effectiveness evaluation value is 0. In this case, the candidate regions A and B are set as a trapezoid on the bottom of an isosceles triangle.

Imaging Region Calculation Function

Returning to FIG. 1, the imaging region calculator 133 sets a plurality of feature extraction lines in the image data and the one or more candidate regions selected by the candidate region selector 132 and calculates a concordance rate of a region between the image data and a candidate region, based on the following Expression (Expression 3).

Concordance rate $R$ of a candidate region=summation{concordance determination [0, 1] between a label number of the image data and a label number of the candidate line segment×(the number of image labels−the proportional length ranking of an image label+1)×(1−|candidate line segment label proportion−image data label proportion|)} Expression 3

For the proportional length rankings, image labels are ranked in descending order of proportional lengths. For example, regarding the proportional length rankings of the extraction line number 1 on the left end of the image data illustrated in FIGS. 2 and 3, the Building with the highest proportion of "0.6" is ranked first, the Sidewalk with the next highest proportion of "0.2" is ranked second, and the Road with the same proportion (of "0.2") as the Sidewalk is jointly ranked second.

The imaging region calculator 133 repeatedly calculates the concordance rate R of the candidate region while adjusting a parameter. The parameter here includes the camera position (vertex of a triangle), the distance x1 or x2 from the camera position to an end point, the distance y1 or y2 from the camera position to a start point, the viewing angle θ, or the direction φ of the camera device 21 illustrated in FIG. 8. The imaging region calculator 133 ends the process when the number of times of repeatedly calculating the concordance rate R by adjusting the parameter is equal to or more than a predetermined number (lower limit) and the increase in the score of the concordance rate R is equal to or less than a predetermined threshold value. The imaging region calculator 133 estimates that the candidate region having the highest concordance rate R among the the plurality of candidate regions for which calculation results have been obtained is the imaging range.

The imaging region calculator 133 outputs the estimated imaging range and information on the camera position at this time to the IoT platform 20.

Flow of Process

Next, a flow of processes executed by the imaging range estimation device 1 will be described.

Overall Flow

Figure 10:
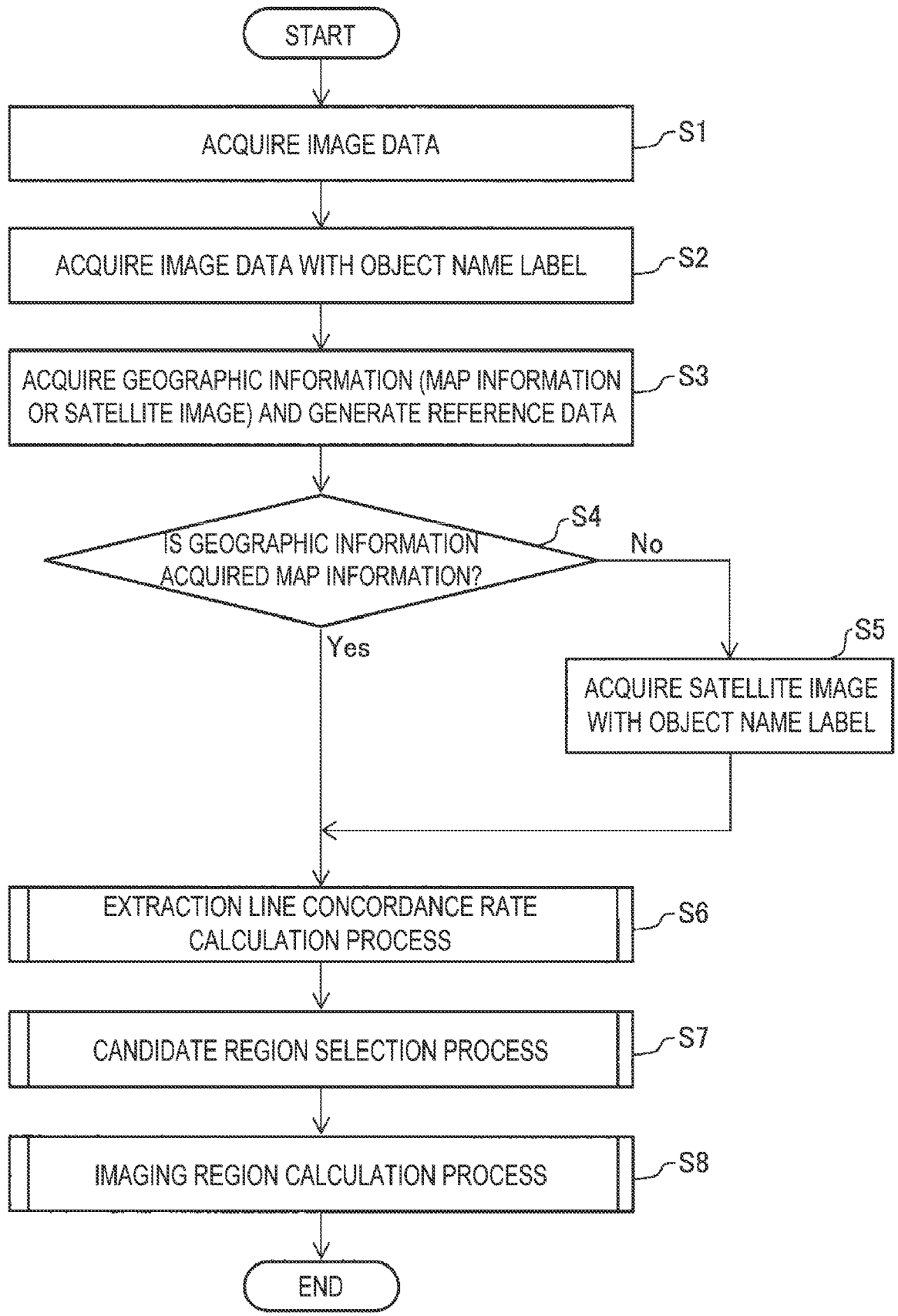
FIG. 10 is a flowchart illustrating an overall process executed by the imaging range estimation device according to an embodiment.

FIG. 10 is a flowchart illustrating a flow of overall processing executed by the imaging range estimation device 1 according to an embodiment.

First, the image data processor 110 of the imaging range estimation device 1 acquires, from the IoT platform 20, image data that is to be processed for estimating an imaging range (Step S1).

At this stage, the image data processor 110 also acquires information regarding the position of the camera device that has taken the image data. When the information regarding the position of the camera device is not information of the installation position of the camera device 21 itself (latitude/longitude, address, or the like), the image data processor 110 collects information (area-specific information) for approximately specifying the region based on information such as an IP address or information on a wireless base station.

By transmitting the acquired image data to the image analysis apparatus 30, the image data processor 110 acquires the information (image data) in which an object name label is assigned to each region in the image data (Step S2).

Then, based on the information regarding the position of the camera device that has been obtained by the image data processor 110, the reference data generator 120 accesses the reference database 40, acquires geographic information (map information or a satellite image), and thereby generates reference data (Step S3). When both the map information and satellite image can be acquired as reference data, the reference data generator 120 may be configured to acquire the information that has been specified in advance. The reference data generator 120 generates, as the reference data, map information and a satellite image within a circular region that is centered on the camera position and has a radius equal to the maximum imaging distance. Information on the maximum imaging distance may be acquired from the IoT platform 20 along with the image data, or a value (for example, 50 meters) set in advance in accordance with an imaging environment of the camera device 21 may be used as the maximum imaging distance.

The reference data generator 120 determines whether the acquired geographic information is map information (Step S4). When the acquired geographic information is map information (Step S4→Yes), the reference data generator 120 determines that the object name label is known based on the map information and the process proceeds to the next Step S6.

When the acquired geographic information is not map information but is a satellite image (Step S4→No), the reference data generator 120 transmits the acquired satellite image to the image analysis apparatus 30 to obtain information (satellite image) in which an object name label is assigned to each region in the satellite image (Step S5). The process then proceeds to the next Step S6.

In the process of Steps S1 to S5, image data with an object name label and reference data with an object name label are prepared.

Then, the imaging range estimator 130 (extraction line calculator 131) of the imaging range estimation device 1 executes an extraction line concordance rate calculation process (Step S6).

Figure 11:
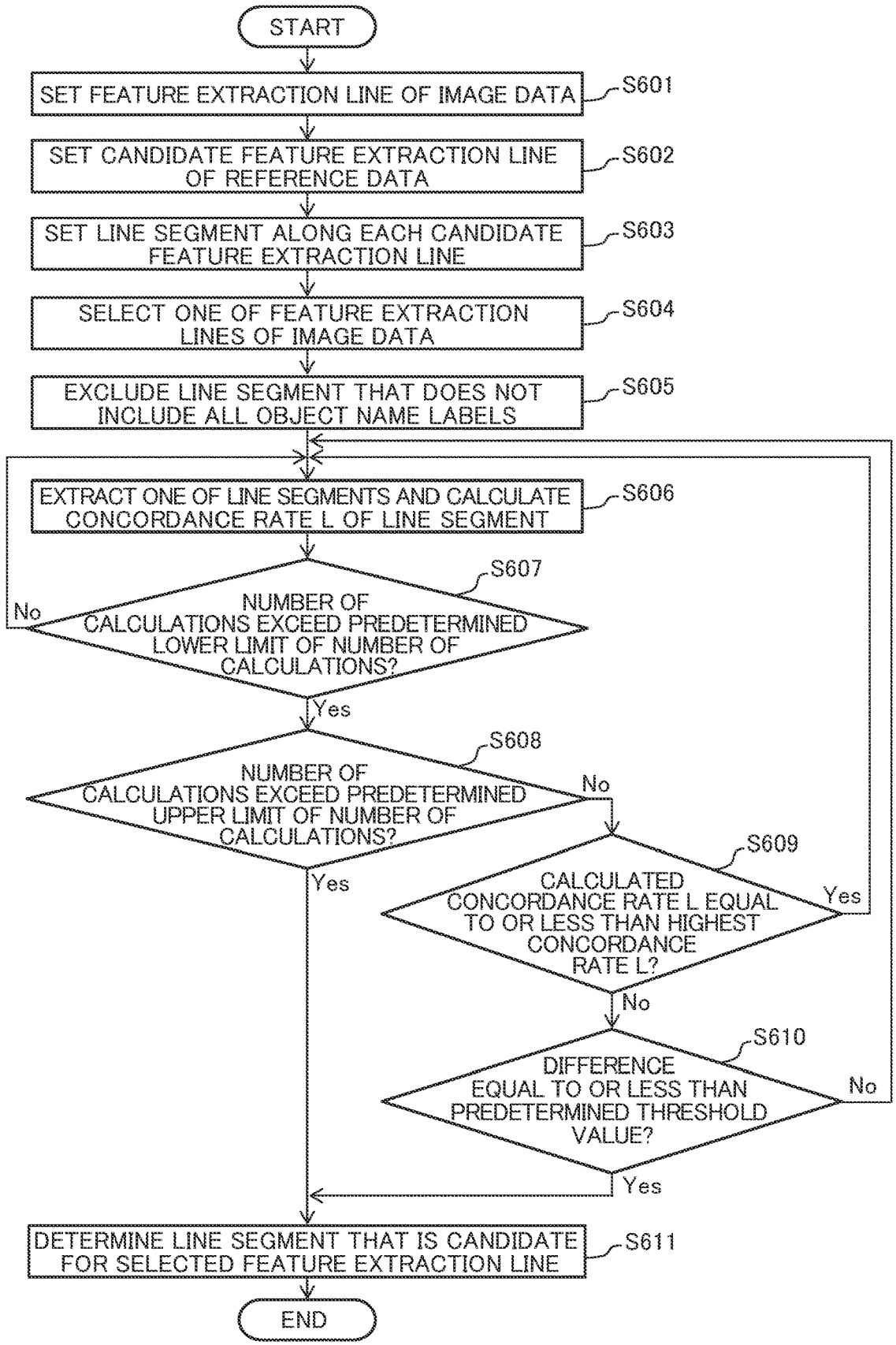
FIG. 11 is a flowchart illustrating an extraction line concordance rate calculation process executed by the imaging range estimation device according to an embodiment.

The extraction line concordance rate calculation process is a process in which the extraction line calculator 131 sets feature extraction lines including the left end and the right end of the image data and calculates line segments that have coinciding proportions of the object name label from among line segments of candidate feature extraction lines provided in the reference data (see FIG. 11 for details). Thus, for each of the feature extraction lines of the left end, the right end, and another set in the image data, a line segment having a high score for the concordance rate L is calculated as the corresponding line segment of the reference data.

Figure 12:
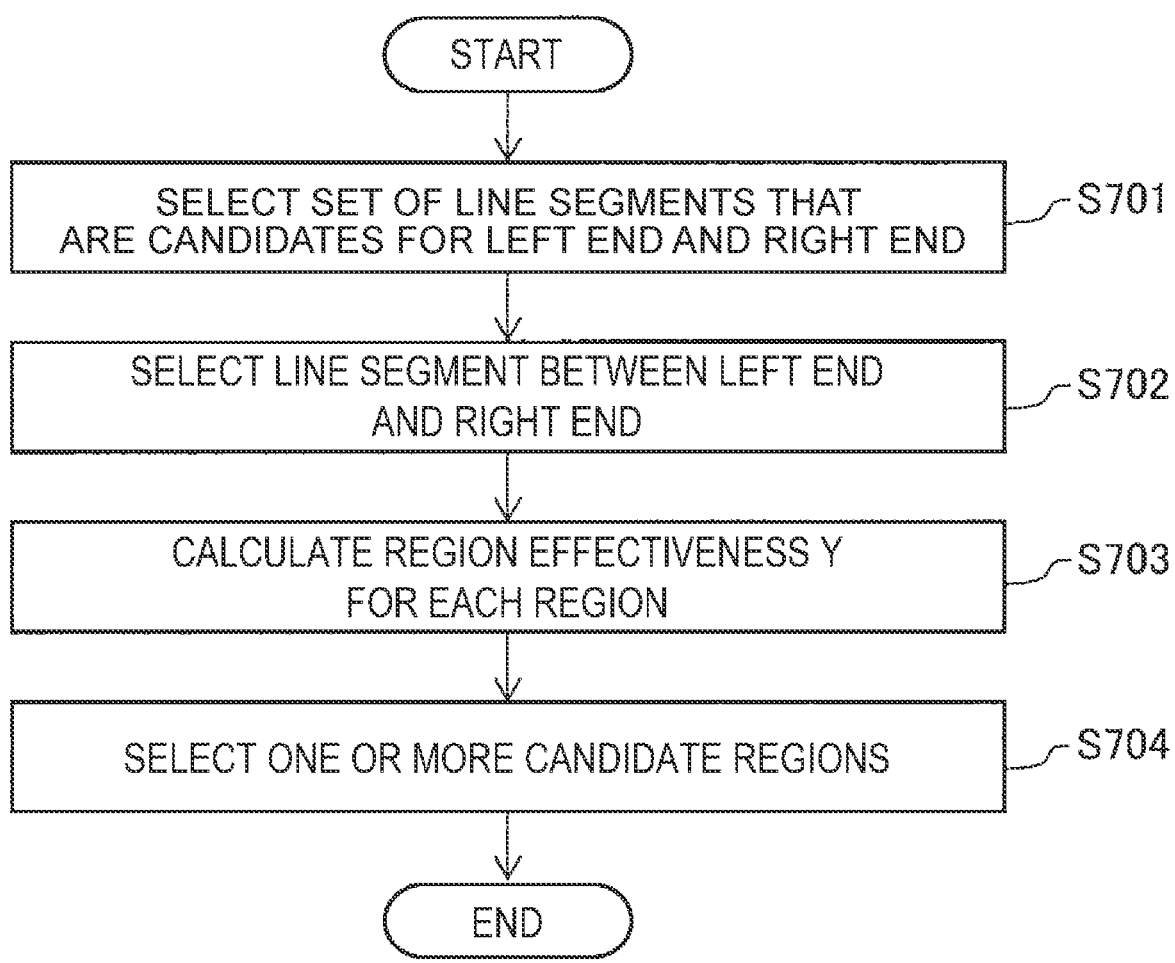
FIG. 12 is a flowchart illustrating a candidate region selection process executed by the imaging range estimation device according to an embodiment.

Then, the candidate region selector 132 of the imaging range estimator 130 executes a candidate region selection process in which one or more candidate regions are selected using information of the line segments on the reference data that correspond to the left end, the right end, and the other and which have been calculated in Step S6 (Step S7; see FIG. 12 for details). At this time, the candidate region selector 132 sets, as the candidate region, a region whose distances from the camera position to the end points on the left end and the right end are close (are equal) based on Expression 2 above. The candidate region selector 132 sets, as the candidate region, a region whose standard deviation of the ratio between the distance of the line segment from the camera position in each extraction line and the distance from the vertex of the triangle illustrated in FIG. 8 to the end point of each extraction line is smaller.

Figure 13:
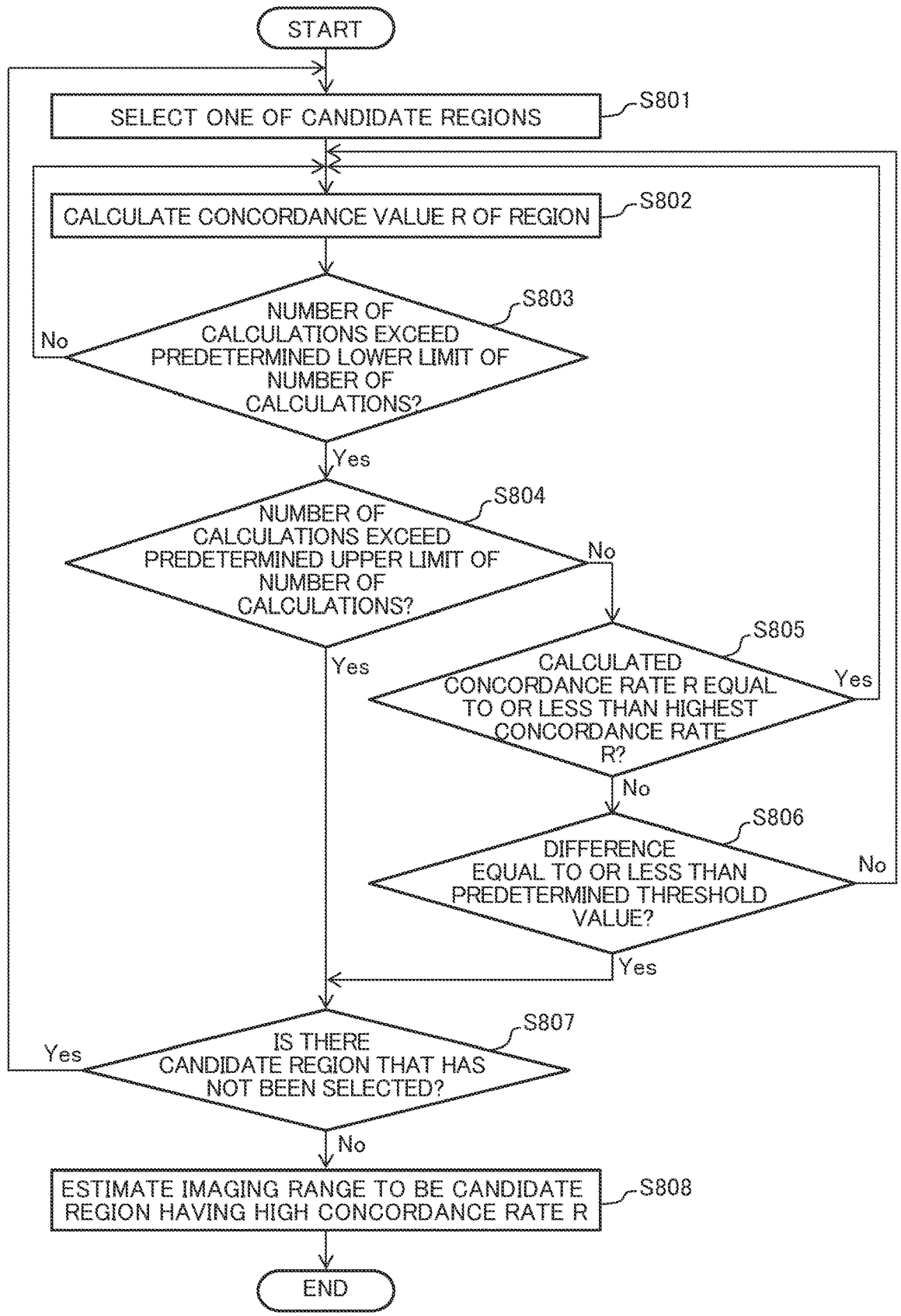
FIG. 13 is a flowchart illustrating an imaging region calculation process executed by the imaging range estimation device according to an embodiment.

Then, the imaging region calculator 133 of the imaging range estimator 130 executes an imaging region calculation process of setting a plurality of feature extraction lines in the image data and the candidate region selected by the candidate region selector 132 and calculating the concordance rate R of a region between the image data and the candidate region (Step S8; see FIG. 13 for details). Thus, the imaging region calculator 133 estimates that the candidate region with the highest concordance rate R is the imaging range of the image data. The imaging region calculator 133 transmits the estimated imaging range of the image data and the position information of the camera device at the time of imaging, to the IoT platform 20.

Extraction Line Concordance Rate Calculation Process

Details of the extraction line concordance rate calculation process executed by the extraction line calculator 131 of the imaging range estimation device 1 will be described. This process is executed in Step S6 of FIG. 10.

FIG. 11 is a flowchart illustrating a flow of the extraction line concordance rate calculation process executed by the imaging range estimation device 1 according to an embodiment.

First, the extraction line calculator 131 extracts an object name on a line drawn from the bottom toward the top of image data and sets a feature extraction line of the image data (Step S601). Here, the extraction line calculator 131 sets feature extraction lines of at least the left end and the right end. FIG. 2 illustrates an example in which feature extraction lines on the left end, the center, and the right end have been set.

Then, in reference data generated by the reference data generator 120, the extraction line calculator 131 draws a line in the radial direction within a circle, extracts an object name on the line, and sets a candidate feature extraction line (Step S602). For example, the extraction line calculator 131 sets candidate feature extraction lines by changing the angle by one degree out of 360 degrees around the position of the camera device 21 (see FIG. 4).

Then, along each candidate feature extraction line, the extraction line calculator 131 sets a line segment corresponding to a line from the start point to the end point of the imaging range (Step S603; see FIG. 5).

The extraction line calculator 131 selects one of the feature extraction lines of the image data that have been set in Step S601 (Step S604). Note that the following processing steps (Steps S605 to S611) are processing steps performed for each of the feature extraction lines of the image data.

The extraction line calculator 131 excludes, from the line segments set in Step S603, a line segment that does not include all the object name labels included in the feature extraction line selected in Step S604 (Step S605).

For example, when the object name labels included in the feature extraction line are a Road, a Sidewalk, and a Building, a line segment that does not include all three of these object name labels is excluded. This is a processing step for reducing the load of the calculation of the concordance rate of the line segments.

Then, the extraction line calculator 131 extracts one of the line segments and calculates the concordance rate L of the line segment based on Expression 1 above (Step S606).

For example, let the label proportions of the feature extraction line on the left end of the data image illustrated in FIG. 2 be (0.2, 0.2, 0.6) for the Road, the Sidewalk, and the Building, as shown for the extraction line number "1" in FIG. 3. In this case, the line segment concordance rate L of each line segment (line segment number "1", "2", "3") illustrated in FIG. 5 is calculated as follows. In this example, the label proportion of each line segment is as illustrated in FIG. 6. In the case of line segment number "1", because the object name labels do not include a Building, this line segment is, in Step S605, removed from the line segments for which the concordance rate L of a line segment is calculated.

Concordance rate $L$ of line segment number "2"=1×(1−|0.5−0.2|)+1×(1−|0.2−0.2|)+1×(1−|0.3−0.6|)=2.4

Concordance rate $L$ of line segment number"3"=1×(1−|0.2−0.2|)+1×(1−|0.2−0.2|)+1×(1−|0.6−0.6|)=3

In Step S606, one line segment, for example, the line segment number "2" described above, is selected, and the concordance rate L of the line segment is calculated as 2.4. The concordance rate L of the line segment number "3" is calculated by the loop processing of extraction of each line segment by the extraction line calculator 131.

When calculating the concordance rate L of a line segment, a larger weight may be applied to an object name label of the image data whose label proportion is high because the probability of erroneous identification is low. For example, since the label proportions of the Road, the Sidewalk, and the Building of the extraction line number "1" in FIG. 3 are (0.2, 0.2, 0.6), a descending order of weights may be set for the Building, the Road, and the Sidewalk in that order, for example, "3", "2", and "2". A term calculating the difference between the label proportions for each object name label may be multiplied with the corresponding weight to calculate the concordance rate L.

Next, returning to FIG. 11, the extraction line calculator 131 determines whether the number of calculations exceeds a predetermined lower limit of a number of calculations for the extracted one line segment (Step S607). When the number of calculations has not exceeded the predetermined lower limit of a number of calculations (Step S607→No), the extraction line calculator 131 adjusts the label proportion for each line segment that was used as a parameter in the calculation of the most recent Step S606, and the process returns to Step S606. In other words, in order to search for a line segment having a label proportion more coinciding with the label proportion of the feature extraction line of the data image, the extraction line calculator 131 repeats the calculation of the concordance rate L of the line segments by fine adjusting the label proportion of each line segment, which is the parameter.

When the number of calculations exceeds the predetermined lower limit of a number of calculations (Step S607→Yes), the extraction line calculator 131 determines whether or not the number of calculations exceeds a predetermined upper limit of a number of calculations (Step S608). When the number of calculations exceeds the predetermined upper limit of a number of calculations (Step S608→Yes), the process proceeds to Step S611.

When the number of calculations has not exceeded the predetermined upper limit of a number of calculations (Step S608→No), the value of the concordance rate L calculated in the most recent Step S606 is compared with the maximum concordance rate L that has been calculated for the line segment prior to the most recent Step S606, and it is determined whether the value of the concordance rate L calculated in the most recent Step S606 is equal to or less than said maximum concordance rate L (Step S609). When the value of the concordance rate L is equal to or less than said maximum concordance rate L (Step S609→Yes), the label proportion of each line segment, which is the parameter, is adjusted, and the process returns to Step S606.

When the value of the concordance rate L is not equal to or less than said maximum concordance rate L (Step S609→No), the extraction line calculator 131 obtains a difference by comparing the value of the concordance rate L calculated in the most recent Step S606 with the maximum concordance rate L calculated for the line segment prior to the most recent step S606 and determines whether the increase is equal to or less than a predetermined threshold value (first threshold value) (Step S610). When the increase is not equal to or less than the predetermined threshold (Step S610→No), the label proportion of each line segment that form the parameter is adjusted, and then the process returns to Step S606. When the increase is equal to or less than the predetermined threshold value (Step S610→Yes), the process proceeds to Step S611.

In Step S611, the extraction line calculator 131 determines (extracts) a line segment having the highest concordance rate L as a line segment that is a potential candidate in the reference data for the feature extraction line (for example, the left end) of the image data selected in Step S604.

This process is executed for each feature extraction line extracted in the image data, and a line segment as the candidate is determined (extracted) for each feature extraction line.

Candidate Region Selection Process

Details of a candidate region selection process executed by the candidate region selector 132 of the imaging range estimation device 1 will be described. This process is executed in Step S7 of FIG. 10.

FIG. 12 is a flowchart illustrating a flow of the candidate region selection process executed by the imaging range estimation device 1 according to an embodiment.

The candidate region selector 132 selects, from the line segments determined to be candidates for each of the feature extraction lines in Step S6 of FIG. 10 (specifically, Step S611 of FIG. 11), a set of line segments that are candidates for the left end and the right end (Step S701).

At this time, the candidate region selector 132 selects the set of line segments for the left end and the right end with the upper limit of the viewing angle θ of the line segments of the left end and the right end set at a predetermined angle (for example, 180 degrees).

Then, the candidate region selector 132 selects a line segment corresponding to another feature extraction line located between the left end and the right end (Step S702). When a feature extraction line located between the left end and the right end is not set, the process of Step S702 is not executed.

Then, the candidate region selector 132 calculates the effectiveness Y of a region by using Expression 2 described above for each region configured from the set of line segments selected in Steps S701 and S702 (Step S703).

By using Expression 2, the closer (equal) the distance to the end point of the right end, which is indicated by x1, is to the distance to the end point of the left end, which is indicated by x2, the closer the effectiveness Y of a region is to 0. Furthermore, the closer (the more equal) the distance from the vertex of the isosceles triangle (camera position) illustrated in FIG. 8 to the bottom side of the isosceles triangle including shading is to the distance of the feature extraction line between the left end and the right end, the closer the effectiveness Y of the region is to 0.

From the result of calculating the effectiveness Y of a region, the candidate region selector 132 selects one or more regions whose value of the effectiveness Y is 0 or close to 0 as candidate regions (Step S704).

For example, as illustrated in FIG. 9, the candidate region A and the candidate region B are selected as candidate regions when their distance from the camera position to the end point of the right end is equal to their distance from the camera position to the end point of the left end and the effectiveness Y of each region is calculated as 0.

In this manner, the candidate region selector 132 can narrow down on the rough candidate regions in the reference data.

Imaging Region Calculation Process

Details of an imaging region calculation process executed by the imaging region calculator 133 of the imaging range estimation device 1 will be described. This process is executed in Step S8 of FIG. 10.

FIG. 13 is a flowchart illustrating a flow of the imaging region calculation process executed by the imaging range estimation device 1 according to an embodiment.

Figure 14:
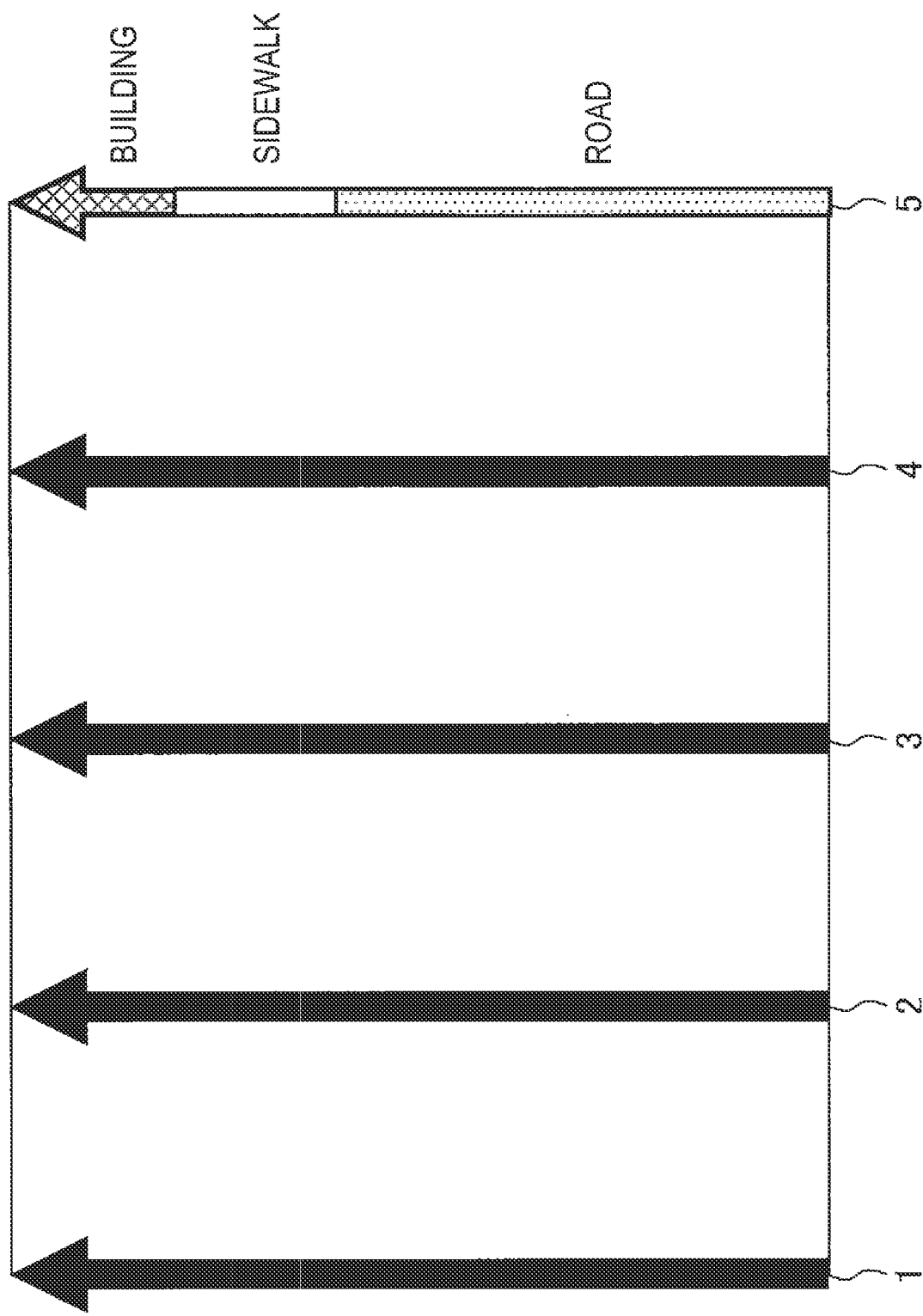
FIG. 14 is a diagram illustrating an example in which a feature extraction line is set in image data.

In the imaging region calculation process, in order to finally specify the imaging range, the concordance rate of a feature extraction line in the candidate region selected in Step S7 of FIG. 10 (specifically, Step S704 of FIG. 12) is verified in detail. Here, description will be made on the assumption that, for example, as illustrated in FIG. 14, five (extraction line numbers "1" to "5") feature extraction lines running from the bottom to the top of the image data are drawn. It is assumed that the label proportions of the feature extraction lines having the extraction line numbers "1" to "5" are values illustrated in FIG. 15. Also, it is assumed that the label proportions of the region candidate A at positions corresponding to the feature extraction lines having the extraction line numbers "1" to "5" are values illustrated in FIG. 16, and the label proportions of the region candidate B at positions corresponding to the feature extraction lines having the extraction line numbers "1" to "5" are values illustrated in FIG. 17.

First, the imaging region calculator 133 selects a candidate region that has not yet been selected from one or more candidate regions (Step S801). Here, it is assumed that the candidate region A is selected first.

Then, the imaging region calculator 133 calculates the concordance rate R of a region between the image data and the candidate region based on Expression 3 described above (Step S802).

Concordance rate $R$ of candidate region $A$ = [extraction line number "1"] + [extraction line number "2"] + ... =

$$[\{1 \times (3 - 2 + 1) \times (1 - |0.2 - 0.2|)\} +$$
$$\{1 \times (3 - 2 + 1) \times (1 - |0.2 - 0.2|)\} + \{1 \times (3 - 1 + 1) \times (1 - |0.6 - 0.6|)\}] +$$
$$[\{1 \times (3 - 2 + 1) \times (1 - |0.3 - 0.3|)\} + \{1 \times (3 - 3 + 1) \times (1 - |0.2 - 0.2|)\} +$$
$$\{1 \times (3 - 1 + 1) \times (1 - |0.5 - 0.5|)\}] + ... = [2 + 2 + 3] + [2 + 1 + 3] + ...$$

In calculating the concordance rate R of this region, the probability of erroneous identification is low for a case where the label proportion of an object name label in the image data is high, and thus a larger weight may be applied. For example, since the label proportions of the Road, the Sidewalk, and the Building of the extraction line number "5" in FIG. 14 are (0.6, 0.2, 0.2) (see FIG. 15), descending order of weights may be set in order of the Road, the Sidewalk, and the Building. For example, weights for the Road, the Sidewalk, and the Building may be set respectively as "3", "2", and "2", and a term for calculating the difference between the label proportions of the object name labels may be multiplied with the respective weights to calculate the concordance rate R of the region.

Then, returning to FIG. 13, the imaging region calculator 133 determines whether the number of calculations for the selected candidate region exceeds a predetermined lower limit of a number of calculations for the concordance rate R of a region (Step S803). When the number of calculations has not exceeded the predetermined lower limit of a number of calculations (Step S803→No), the imaging region calculator 133 changes a parameter used in the calculation of the most recent Step S802, namely x1, x2, y1, or y2 of the candidate region in FIG. 8, the viewing angle θ, the direction φ of the camera device 21, or the camera position of the camera device 21 to adjust the label proportion for each extraction line. Then, the process returns to Step S802. In other words, in order to search for a region on the reference data that coincides more with the region indicated by the image data, the imaging region calculator 133 repeats the calculation of the concordance rate R of a region by fine adjusting the parameters.

When the number of calculations exceeds the predetermined lower limit of a number of calculations (Step S803→Yes), the imaging region calculator 133 determines whether the number of calculations exceeds a predetermined upper limit of a number of calculations (Step S804). When the number of calculations exceeds the predetermined upper limit of a number of calculations (Step S804→Yes), the process proceeds to Step S807.

When the number of calculations has not exceeded the predetermined upper limit of a number of calculations (Step S804→No), the value of the concordance rate R of a region calculated in the most recent Step S802 is compared with a maximum concordance rate R that has been calculated before for the candidate region, and it is determined whether the value of the concordance rate R of a region calculated in the most recent Step S802 is equal to or less than the maximum concordance rate R (Step S805). When the value of the concordance rate R is equal to or less than the maximum concordance rate R (Step S805→Yes), the label proportion for each extraction line is adjusted by changing the parameters of the candidate region, and then the process returns to Step S802.

When the value of the concordance rate R is not equal to or less than the maximum concordance rate R (Step S805→No), the imaging region calculator 133 compares the value of the concordance rate R calculated in the most recent Step S802 to the maximum concordance rate R that has been calculated before for the candidate region and determines whether the increase is equal to or less than a predetermined threshold value (second threshold value) (Step S806). When the increase is not equal to or less than the predetermined threshold (Step S806→No), the label proportion for each extraction line is adjusted by changing the parameters of the candidate region, and then the process returns to Step S802. When the increase is equal to or less than the predetermined threshold value (Step S806→Yes), the process proceeds to Step S807.

In Step S807, the imaging region calculator 133 determines whether there is a candidate region that has not yet been selected. When there is a candidate region that has not yet been selected (Step S807→Yes), the process returns to Step S801 to continue the process for the next candidate region.

For example, in Step S802 of this case, the concordance rate R of the candidate region B is calculated as follows.

Concordance rate $R$ of candidate region $B$ = [extraction line number "1"] + [extraction line number "2"] +

... = [{1 × (3 − 2 + 1) × (1 − |0.2 − 0.2|)} +

{1 × (3 − 2 + 1) × (1 − |0.2 − 0.2|)} + {1 × (3 − 1 + 1) × (1 − |0.6 − 0.6|)} +

[{1 × (3 − 1 + 1) × (1 − |1.0 − 0.3|)} + 0 + 0] + ... = [2 + 2 + 3] + [0.9] + ...

In Step S807, when there is no candidate region that has not been selected (Step S807→No), the imaging range is estimated to be the candidate region having the highest concordance rate R among one or more candidate regions in Step S808.

In calculating the concordance rates R of the candidate region A and the candidate region B, a large difference occurs in the scores for the extraction line number "2". Thus, a region obtained by adjusting the candidate region A is estimated to be the imaging range. The imaging region calculator 133 outputs information of the estimated imaging range and the position information of the camera device at the time of imaging, to the IoT platform 20, and then ends the process.

As described above, the imaging range estimation device 1 according to an embodiment can estimate the imaging range and the position of the camera device 21 from a camera image without depending on information of an image taken on the ground collected in advance or the presence of a building.

Figure 18:
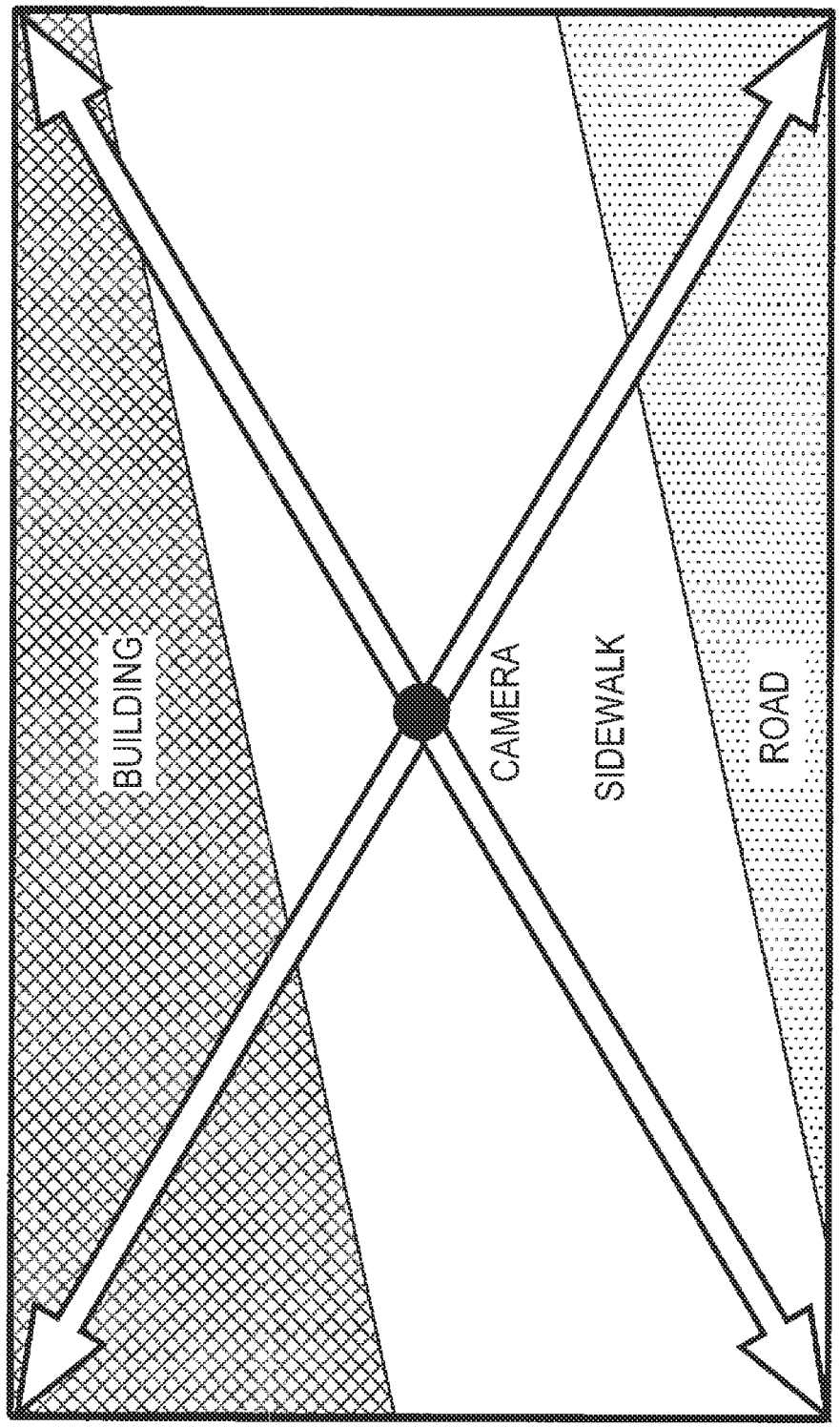
FIG. 18 is a diagram illustrating an example in which the feature extraction line is set in image data when a camera device is directed in a direction perpendicular (directly below) to the ground.

The above description has been given for a case where the camera device 21 performs imaging in a diagonally downward direction. The imaging range estimation device 1 according to an embodiment is not limited thereto, and, for example, as illustrated in FIG. 18, the camera device 21 may be facing downwards in a direction perpendicular (directly below) to the ground. In this case, lines are drawn from the center portion (the center and the vicinity of the center) of the image data at the closest distance from the camera device 21 toward the four corners of an angle of view to extract an object name on the lines, and the lines are set as the feature extraction lines of the image data. In the extraction line concordance rate calculation process, by setting at least four feature extraction lines from the center portion to the four corners of the image data, it is possible to similarly estimate the imaging range and the position of the camera device 21.

Furthermore, the above description has been given for a case where the imaging range and the position of a camera device 21 installed outside are estimated. The imaging range estimation device 1 according to an embodiment is applicable for an indoor environment as well (for example, an event venue inside a building, an indoor stadium, or an indoor concert hall). In this case, the arrangement (position information) of a wall, a seat, or the like is acquired from a floor plan or design drawing (indoor design drawing information) and is set as the reference data, and the label proportion of the object name label is calculated to obtain the concordance rate with the image data. In this way, even when the camera device 21 is installed indoors, the imaging range estimation device 1 can estimate the imaging range and the camera position.

Hardware Configuration

Figure 19:
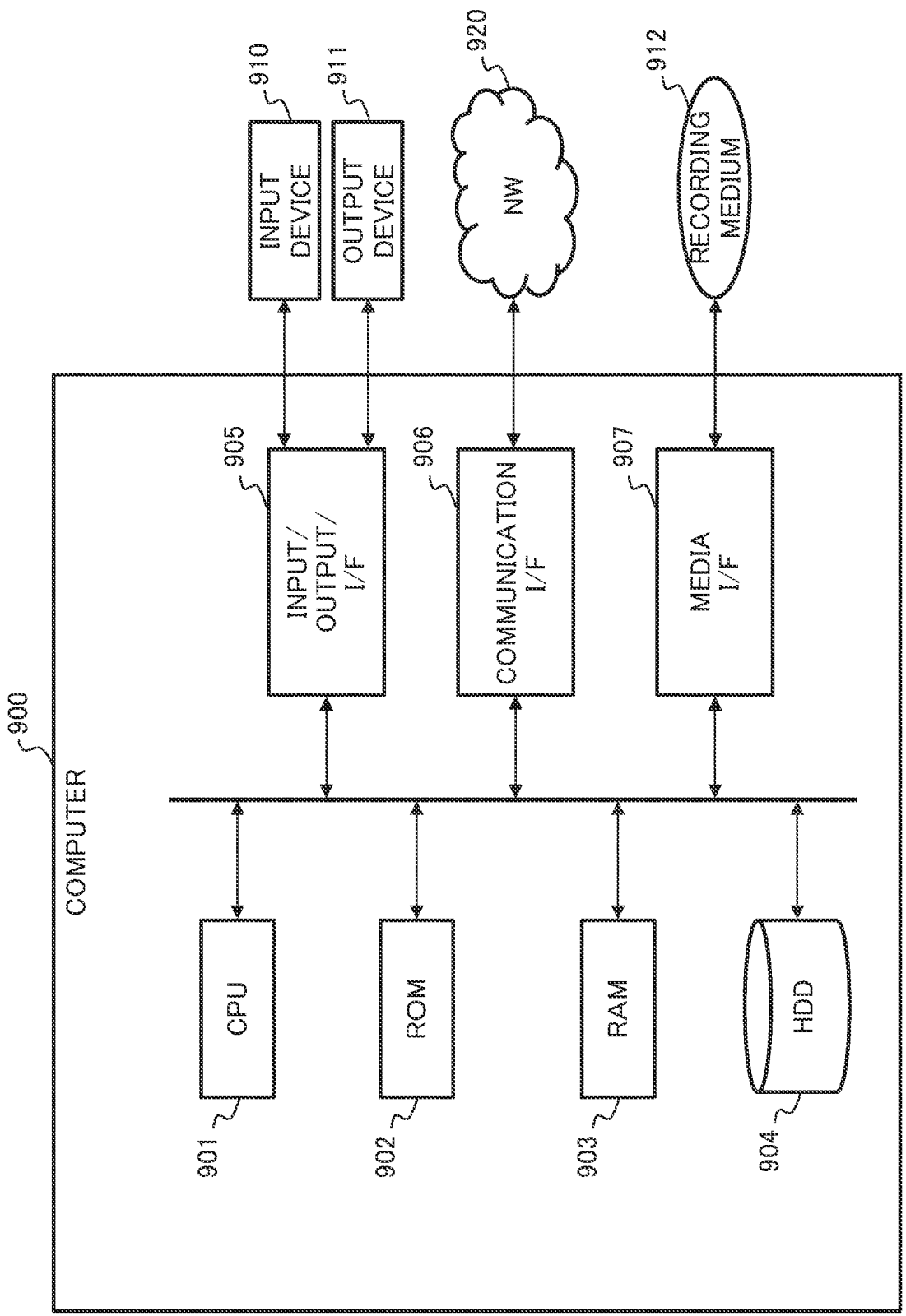
FIG. 19 is a hardware configuration diagram illustrating an example of a computer that implements functions of the imaging range estimation device according to an embodiment.

The imaging range estimation device 1 according to an embodiment is realized by a computer 900 configured as illustrated in FIG. 19, for example.

FIG. 19 is a hardware configuration diagram illustrating an example of the computer 900 that implements functions of the imaging range estimation device 1 according to the embodiment. The computer 900 includes a central processing unit (CPU) 901, a read only memory (ROM) 902, a random access memory (RAM) 903, a hard disk drive (HDD) 904, an input-output interface (I/F) 905, a communication I/F 906, and a media I/F 907.

The CPU 901 operates in accordance with a program stored in the ROM 902 or the HDD 904 and performs control of the controller 10 of FIG. 1. The ROM 902 stores therein a boot program that is executed by the CPU 901 when the computer 900 is activated, a program for the hardware of the computer 900, and the like.

The CPU 901 controls, through the input-output I/F 905, an input device 910 such as a mouse or a keyboard, and an output device 911 such as a display or a printer. Through the input-output I/F 905, the CPU 901 acquires data from the input device 910 and outputs generated data to the output device 911.

The HDD 904 stores therein a program executed by the CPU 901, data used by the program, and the like. The communication I/F 906 receives data from another apparatus (not illustrated) (for example, the image analysis apparatus 30) through a communication network (for example, a network 920) and outputs the received data to the CPU 901, and transmits data generated by the CPU 901 to another apparatus through the communication network.

The media I/F 907 reads a program or data stored in a recording medium 912 and outputs the program or the data that has been read to the CPU 901 through the RAM 903. The CPU 901 loads, in the RAM 903, a program for an intended process from the recording medium 912 through the media I/F 907 and executes the loaded program. The recording medium 912 is an optical recording medium such as a digital versatile disc (DVD) or a phase change rewritable disk (PD), a magneto-optical recording medium such as a magneto optical disk (MO), a magnetic recording medium, a conductor memory tape medium, a semiconductor memory or the like.

For example, when the computer 900 functions as the imaging range estimation device 1 according to the embodiment, the CPU 901 of the computer 900 implements the functions of the imaging range estimation device 1 by executing the programs loaded on the RAM 903. In addition, the HDD 904 stores therein data in the RAM 903. The CPU 901 reads a program for an intended process from the recording medium 912 and executes it. Furthermore, the CPU 901 may read a program for an intended process from another apparatus through a communication network (the network 920).

Effects

Hereinafter, effects of the imaging range estimation device according to the present invention will be described.

According to an embodiment of the invention, an imaging range estimation device 1 that estimates an imaging range of a camera device 21 includes: an image data processor 110 configured to acquire image data imaged by the camera device 21, perform image analysis to identify a first region occupied by each object reflected in the image data by adding an object name label to the first region, and generate image data with the object name label added; a reference data generator 120 configured to set a second region within a predetermined distance by using geographic information, the second region being imagable from an estimated position at which the camera device 21 is installed, and generate reference data in which an object name label is added to an object in the second region that is set; and an imaging range estimator 130 configured to calculate a concordance rate by comparing a first feature indicated by the first region of each object name label of the image data with a second feature indicated by a region of each object name label of the reference data, and estimate the imaging range of the camera device 21 to be a region of the reference data that corresponds to the image data.

In this manner, the imaging range estimation device 1 according to an embodiment can estimate an imaging range of the camera device 21 from a camera image (image data) without depending on information of images taken on the ground and collected in advance or depending on the presence of a building.

The imaging range estimation device 1 uses citywide geographic information (for example, map information or a satellite image) to calculate the concordance rate of a feature with the image data. Thus, it is not necessary for a user of the camera device 21 to register new information in an IoT platform 20, and it is not necessary for a service provider to take additional on-the-ground, high precision images for image information. In addition, it is possible to estimate an imaging range of the camera device 21 without depending on buildings. Thus, the imaging range estimation device 1 can estimate an imaging range of the camera device 21 in a wide region and in a simplified manner in comparison to the related-art.

In the imaging range estimation device 1 according to an embodiment, the imaging range estimator 130 is further configured to: set a feature extraction line for extracting an object name label by drawing a line from the bottom to the top of the image data; set a candidate feature extraction line for extracting an object name label by drawing a line in a radial direction within a circle centered on the estimated position in the reference data; and calculate the concordance rate by comparing, as the first feature and the second feature, a first label proportion of each object name label extracted from the feature extraction line for the image data with a second label proportion of each object name label extracted from the candidate feature extraction line for the reference data.

As described above, the imaging range estimation device 1 can calculate the concordance rate by using the label proportion of the object name label as the feature, and estimate a region having the label proportion of the reference data that coincides with the label proportion of the image data as the imaging range of the camera device 21.

In the imaging range estimation device 1 according to an embodiment, the imaging range estimator 130 is further configured to: set line segments whose start points and end points are on the candidate feature extraction lines so that object name labels are extracted from the line segments; set the feature extraction lines onto at least a left end and a right end of the image data; calculate a concordance rate between the label proportions for each of at least the left end and the right end of the image data that have been set and label proportions of the object name labels of the line segments; extract a plurality of the line segments on the reference data, the plurality of the line segments respectively corresponding to at least the left and the right end of the image data; and estimate, as the imaging range of the camera device 21, a quadrangular region surrounded by the line segments corresponding to the left end and the right end.

As described above, the imaging range estimation device 1 can extract line segments on the reference data that coincides with the label proportion of each of at least the left end and the right end of the image data and estimate the imaging range of the camera device 21 to be a region of a quadrangle surrounded by the line segments.

In the imaging range estimation device 1 according to an embodiment, the concordance rate is calculated by applying a larger weight to an object name label having the higher label proportion among object name labels added to the image data.

As described above, the imaging range estimation device 1 can improve the accuracy of the estimation of the imaging range of the camera device 21 by increasing the weight of an object name label with a high label proportion that has a low probability of erroneous identification.

In the imaging range estimation device 1 according to embodiment, the feature extraction line is not set from the bottom to the top of the image data but set from a center portion to four corners of the image data.

Thus, even when the camera device 21 is directed in a direction perpendicular (directly below) to the ground, the imaging range estimation device 1 can estimate the imaging range of the camera device 21 by setting the feature extraction lines from the center portion of the image data toward the four corners.

In the imaging range estimation device 1 according to an embodiment, indoor design drawing information is used as the geographic information.

Thus, the imaging range estimation device 1 can estimate an imaging range for the camera device 21 installed indoors.

The present invention is not limited to the embodiment described above, and various modifications can be made by those skilled in the art within the technical idea of the present invention.

REFERENCE SIGNS LIST

1 Imaging range estimation device
10 Controller
11 Input/output unit
12 Storage
20 IoT platform
21 Camera device
30 Image analysis apparatus
40 Reference database
41 Map information
42 Satellite image
110 Image data processor 120 Reference data generator
130 Imaging range estimator
131 Extraction line calculator
132 Candidate region selector
133 Imaging region calculator

The invention claimed is:

1. An imaging range estimation device that estimates an imaging range of a camera device, the imaging range estimation device comprising:
a hardware processor, wherein
the hardware processor is configured to:
  generate image data with an object name label added by:
    acquiring image data imaged by the camera device, and
    performing image analysis to identify a first region occupied by each object displayed in the image data by adding an object name label to the first region;
  generate reference data of a reference region including an object name label associated with an object in the reference region by:
    setting the reference region by using geographic information, the reference region being a circular region including an estimated position of the camera device at a center and a surrounding region that is within a predetermined distance from the estimated position, the predetermined distance being a maximum imaging distance of the camera device;
  calculate a concordance rate by comparing a first feature indicated by the first region of each object name label of the image data with a second feature indicated by a second region of each object name label of the reference data;
  estimate the imaging range of the camera device to be a quadrangular region of the reference data that corresponds to the image data;
  set an image feature extraction line for extracting the object name label by drawing a line from a bottom side to a top side of the image data;
  set the image feature extraction line along at least a left end and a right end of the image data;
  set candidate feature extraction lines for extracting the object name label by drawing lines in the circular region of the reference data, each line being drawn in a radial direction from the estimated position of the camera device to an edge of the circular region;
  set line segments that are along the candidate feature extraction lines, each line segment being a segment of a candidate feature extraction line and including a start point and an end point on the candidate feature extraction line;
  extract, for each image feature extraction line that has been set, a line segment on the reference data that corresponds to the image feature extraction line by:
    calculating, for each of the line segments, a concordance rate between a first label proportion of each object name label of the image feature extraction line and a second label proportion of each object name label of the line segment, and
    determining a line segment with a highest concordance rate to correspond to the image feature extraction line; and
  estimate the imaging range of the camera device to be the quadrangular region whose left and right sides are the extracted line segments that correspond to the image feature extraction lines along the left end and the right end of the image data, wherein
  the first label proportion is a proportion of the image feature extraction line that is occupied by an object corresponding to the object name label in relation to the image feature extraction line, and wherein
  the second label proportion is a proportion of the line segment that is occupied by an object corresponding to the object name label in relation to the line segment.

2. The imaging range estimation device according to claim 1, wherein indoor design drawing information is used as the geographic information.

3. The imaging range estimation device according to claim 1, wherein the concordance rate is calculated by applying a larger weight to an object name label having the first label proportion that is higher among the object name labels added to the image data.

4. The imaging range estimation device according to claim 3, wherein the feature extraction line is not set from the bottom to the top of the image data but set from a center portion to four corners of the image data.

5. The imaging range estimation device according to claim 3, wherein indoor design drawing information is used as the geographic information.

6. The imaging range estimation device according to claim 1, wherein the feature extraction line is not set from the bottom to the top of the image data but set from a center portion to four corners of the image data.

7. The imaging range estimation device according to claim 6, wherein indoor design drawing information is used as the geographic information.

8. An imaging range estimation method of an imaging range estimation device that estimates an imaging range of a camera device, the imaging range estimation method comprising:
generating image data with an object name label added by:
  acquiring image data imaged by the camera device, and
  performing image analysis to identify a first region occupied by each object displayed in the image data by adding an object name label to the first region;
generating reference data of a reference region including an object name label associated with an object in the reference region by:
  setting the reference region by using geographic information, the reference region being a circular region including an estimated position of the camera device at a center and a surrounding region that is within a predetermined distance from the estimated position, the predetermined distance being a maximum imaging distance of the camera device;
calculating a concordance rate by comparing a first feature indicated by the first region of each object name label of the image data with a second feature indicated by a second region of each object name label of the reference data;
estimating the imaging range of the camera device to be a quadrangular region of the reference data that corresponds to the image data;
setting an image feature extraction line for extracting the object name label by drawing a line from a bottom side to a top side of the image data;
setting the image feature extraction line along at least a left end and a right end of the image data;

setting candidate feature extraction lines for extracting the object name label by drawing lines in the circular region of the reference data, each line being drawn in a radial direction from the estimated position of the camera device to an edge of the circular region;

setting line segments that are along the candidate feature extraction lines, each line segment being a segment of a candidate feature extraction line and including a start point and an end point on the candidate feature extraction line;

extracting, for each image feature extraction line that has been set, a line segment on the reference data that corresponds to the image feature extraction line by:
  calculating, for each of the line segments, a concordance rate between a first label proportion of each object name label of the image feature extraction line and a second label proportion of each object name label of the line segment, and
  determining a line segment with a highest concordance rate to correspond to the image feature extraction line; and estimating the imaging range of the camera device to be the quadrangular region whose left and right sides are the extracted line segments that correspond to the image feature extraction lines along the left end and the right end of the image data, wherein
  the first label proportion is a proportion of the image feature extraction line that is occupied by an object corresponding to the object name label in relation to the image feature extraction line, and wherein
  the second label proportion is a proportion of the line segment that is occupied by an object corresponding to the object name label in relation to the line segment.

9. A non-transitory storage medium storing a program executable by a computer, the program causing the computer to perform operations comprising:
  generating image data with an object name label added by:
    acquiring image data imaged by the camera device, and
    performing image analysis to identify a first region occupied by each object displayed in the image data by adding an object name label to the first region;
  generating reference data of a reference region including an object name label associated with an object in the reference region by:
    setting the reference region by using geographic information, the reference region being a circular region including an estimated position of the camera device at a center and a surrounding region that is within a predetermined distance from the estimated position, the predetermined distance being a maximum imaging distance of the camera device;
  calculating a concordance rate by comparing a first feature indicated by the first region of each object name label of the image data with a second feature indicated by a second region of each object name label of the reference data;
  estimating the imaging range of the camera device to be a quadrangular region of the reference data that corresponds to the image data;
  setting an image feature extraction line for extracting the object name label by drawing a line from a bottom side to a top side of the image data;
  setting the image feature extraction line along at least a left end and a right end of the image data;
  setting candidate feature extraction lines for extracting the object name label by drawing lines in the circular region of the reference data, each line being drawn in a radial direction from the estimated position of the camera device to an edge of the circular region;
  setting line segments that are along the candidate feature extraction lines, each line segment being a segment of a candidate feature extraction line and including a start point and an end point on the candidate feature extraction line;
  extracting, for each image feature extraction line that has been set, a line segment on the reference data that corresponds to the image feature extraction line by:
    calculating, for each of the line segments, a concordance rate between a first label proportion of each object name label of the image feature extraction line and a second label proportion of each object name label of the line segment, and
    determining a line segment with a highest concordance rate to correspond to the image feature extraction line; and
  estimating the imaging range of the camera device to be the quadrangular region whose left and right sides are the extracted line segments that correspond to the image feature extraction lines along the left end and the right end of the image data, wherein
    the first label proportion is a proportion of the image feature extraction line that is occupied by an object corresponding to the object name label in relation to the image feature extraction line, and wherein
    the second label proportion is a proportion of the line segment that is occupied by an object corresponding to the object name label in relation to the line segment.

* * * * *